US012562076B2

(12) United States Patent　　　(10) Patent No.: US 12,562,076 B2
Ohnishi et al.　　　　　　　　　　(45) Date of Patent: Feb. 24, 2026

(54) LEARNING ASSISTANCE SYSTEM, LEARNING ASSISTANCE METHOD, AND LEARNING ASSISTANCE STORAGE MEDIUM

(71) Applicants:KEIO UNIVERSITY, Tokyo (JP);
Motion Lib, Inc., Kawasaki (JP)

(72) Inventors: Kouhei Ohnishi, Kanagawa (JP);
Takahiro Mizoguchi, Kanagawa (JP);
Wataru Iida, Kanagawa (JP)

(73) Assignees: KEIO UNIVERSITY, Tokyo (JP);
MOTION LIB, INC., Tokyo (JP)

( * ) Notice: Subject to any disclaimer, the term of this patent is extended or adjusted under 35 U.S.C. 154(b) by 116 days.

(21) Appl. No.: 17/802,937

(22) PCT Filed: Feb. 26, 2021

(86) PCT No.: PCT/JP2021/007565
§ 371 (c)(1),
(2) Date: Aug. 26, 2022

(87) PCT Pub. No.: WO2021/172572
PCT Pub. Date: Sep. 2, 2021

(65) Prior Publication Data
US 2023/0141048 A1　　May 11, 2023

(30) Foreign Application Priority Data
Feb. 27, 2020　　(JP) .................................. 2020-032474

(51) Int. Cl.
*B25J 13/02*　　　　(2006.01)
*B25J 3/04*　　　　(2006.01)
(Continued)

(52) U.S. Cl.
CPC ................ *G09B 19/24* (2013.01); *B25J 3/04* (2013.01); *B25J 13/02* (2013.01)

(58) Field of Classification Search
CPC ... G09B 19/24; B25J 3/04; B25J 13/02; B25J 9/1664; B25J 9/1689; G05B 19/42; G06Q 50/20
See application file for complete search history.

(56) References Cited

U.S. PATENT DOCUMENTS

| | | |
|---|---|---|
| 2003/0135203 A1 | 7/2003 | Wang et al. |
| 2007/0112466 A1 | 5/2007 | Ohnishi et al. |

(Continued)

FOREIGN PATENT DOCUMENTS

| | | |
|---|---|---|
| JP | H06209902 A | 8/1994 |
| JP | H08145007 A | 6/1996 |

(Continued)

OTHER PUBLICATIONS

International Search Report (ISR) (and English language translation thereof) dated May 18, 2021, issued in International Application No. PCT/JP2021/007565.

(Continued)

*Primary Examiner* — Adam R Mott
*Assistant Examiner* — Heather J Keniry
(74) *Attorney, Agent, or Firm* — Holtz, Holtz & Volek PC

(57) ABSTRACT

A learning assistance system includes an operation control unit, a parameter acquisition unit, and a display control unit. The operation control unit causes an apparatus to be controlled to operate in accordance with force tactile sensation during operation by a user. The parameter acquisition unit acquires control parameters that are used for the control by the operation control unit. The operation control unit and the display control unit comparably provide, to a second user, a first control parameter acquired by the parameter acquisition unit in a case where the operation control unit controlled the operation of the apparatus based on operation by the first user and a second control parameter acquired by the param- (Continued)

eter acquisition unit in a case where the operation control unit controlled the operation of the apparatus based on operation by the second user.

5 Claims, 16 Drawing Sheets

(51) Int. Cl.
| | |
|---|---|
| *B25J 9/16* | (2006.01) |
| *G05B 19/42* | (2006.01) |
| *G06Q 50/20* | (2012.01) |
| *G09B 19/24* | (2006.01) |

(56) References Cited

U.S. PATENT DOCUMENTS

| | | | |
|---|---|---|---|
| 2009/0110533 A1 | 4/2009 | Jinno | |
| 2010/0245237 A1 | 9/2010 | Nakamura | |
| 2014/0094968 A1* | 4/2014 | Taylor | B25J 13/006 |
| | | | 700/257 |
| 2015/0137727 A1 | 5/2015 | Furutani et al. | |
| 2015/0360365 A1* | 12/2015 | Fudaba | B25J 9/1679 |
| | | | 700/254 |
| 2016/0207196 A1 | 7/2016 | Ohnishi et al. | |
| 2018/0185110 A1* | 7/2018 | Kumar | G09B 23/28 |
| 2018/0350086 A1 | 12/2018 | Sweet et al. | |
| 2019/0143510 A1 | 5/2019 | Ohnishi et al. | |
| 2019/0201136 A1* | 7/2019 | Shelton, IV | A61B 1/051 |
| 2019/0318660 A1* | 10/2019 | Kimoto | B25J 13/06 |
| 2020/0237456 A1* | 7/2020 | Prisco | A61B 34/30 |
| 2020/0289222 A1* | 9/2020 | Denlinger | B25J 9/1664 |
| 2020/0376681 A1 | 12/2020 | Ohnishi et al. | |
| 2021/0107134 A1 | 4/2021 | Shimono et al. | |
| 2021/0282795 A1 | 9/2021 | Shimono et al. | |
| 2021/0334336 A1 | 10/2021 | Ohnishi et al. | |
| 2022/0063095 A1* | 3/2022 | Kamon | B25J 3/00 |
| 2022/0134542 A1 | 5/2022 | Ohnishi et al. | |
| 2022/0139261 A1* | 5/2022 | Ueltschi | G09B 23/285 |
| | | | 434/262 |

FOREIGN PATENT DOCUMENTS

| | | |
|---|---|---|
| JP | 2000047567 A | 2/2000 |
| JP | 2001067113 A | 3/2001 |
| JP | 2001166676 A | 6/2001 |
| JP | 2002287613 A | 10/2002 |
| JP | 2002312003 A | 10/2002 |
| JP | 2004318400 A | 11/2004 |
| JP | 2005515012 A | 5/2005 |
| JP | 2007274783 A | 10/2007 |
| JP | 2009107095 A | 5/2009 |
| JP | 2009279699 A | 12/2009 |
| JP | 2011152333 A | 8/2011 |
| JP | 2014215563 A | 11/2014 |
| JP | 2017168121 A | 9/2017 |
| JP | 2019030960 A | 2/2019 |
| WO | 2005109139 A1 | 11/2005 |
| WO | 2013108356 A1 | 7/2013 |
| WO | 2015041046 A1 | 3/2015 |
| WO | 2019117309 A1 | 6/2019 |
| WO | 2021025087 A1 | 2/2021 |

OTHER PUBLICATIONS

Written Opinion dated May 18, 2021, issued in International Application No. PCT/JP2021/007565.

* cited by examiner

| ACTUATORS | POSITIONS | | | |
|:---:|:---:|:---:|:---:|:---:|
| | t1 | t2 | t3 | ... |
| A1 | p1 | p2 | p3 | ... |
| A2 | : | : | : | ... |
| A3 | : | : | : | ... |
| A4 | : | : | : | ... |

(b)

| VALUES | RESULT OF COORDINATE CONVERSION | | | |
|:---:|:---:|:---:|:---:|:---:|
| | t1 | t2 | t3 | ... |
| $x''_{a1}$ | q1 | q2 | q3 | ... |
| $x''_{a2}$ | : | : | : | ... |
| $x''_{a3}$ | : | : | : | ... |
| $x''_{\tau 1}$ | : | : | : | ... |
| $x''_{\tau 2}$ | : | : | : | ... |
| $x''_{\tau 3}$ | : | : | : | ... |
| $x''_{t1}$ | : | : | : | ... |
| $x''_{t2}$ | : | : | : | ... |

FIG. 7

1:LEARNING ASSISTANCE APPARATUS

| CONTROL UNIT | → | DRIVER | → | ACTUATOR | → | POSITION SENSOR |

10       20       30       40

IMPLEMENTATION DATA (SOLID LINE): ——
TEACHER DATA (DOTTED LINE): -------

IMPLEMENTATION DATA (SOLID LINE): ——
TEACHER DATA (DOTTED LINE):      ------

THE IMPLEMENTATION DATA IS SHIFTED ALONG
THE HORIZONTAL AXIS AND IS DISPLAYED.

IMPLEMENTATION DATA (SOLID LINE): ——
TEACHER DATA (DOTTED LINE):    ------

A SELECTION OF THE PERIOD FOR THE
QUANTIFICATION IS RECEIVED.

DIRECTION IN WHICH END
EFFECTOR 71 MOVES

LEARNING ASSISTANCE SYSTEM, LEARNING ASSISTANCE METHOD, AND LEARNING ASSISTANCE STORAGE MEDIUM

TECHNICAL FIELD

The present invention relates to a learning assistance system, a learning assistance method, and a learning assistance storage medium.

BACKGROUND ART

In the case where movement in various actions is learned, observation of the movement of an expert in the actions is typically effective. For example, a learner who is going to learn movement observes the movement of an expert directly or in, for example, a video and repeatedly trains the movement by imitating the observed movement of the expert. Such training after the observation of the movement of the expert enables the movement to be more effectively learned than the case where a description in, for example, a book is merely referred.

PTL 1 discloses an example of a technique for assisting the learner to learn movement. In the technique disclosed in PTL 1, a video that records the movement of an expert and a video that records the movement of the learner are compared by using pattern matching. Consequently, whether there is a difference between the movement of the expert and the movement of the learner is objectively determined, and the learner can be assisted.

CITATION LIST

Patent Literature

[PTL 1]
  Japanese Unexamined Patent Application Publication No. 2011-152333

SUMMARY OF INVENTION

Technical Problem

As for the typical technique disclosed in PTL 1, however, the learner is assisted to learn the movement merely by using information (for example, the video) that is acquired by visually observing the movement of the expert. There is a need not only to use information that is acquired by visually observing the expert but also to more efficiently assist the learner to learn the movement.

Solution to Problem

According to one embodiment, a learning assistance system includes: an operation controller for controlling an apparatus to be controlled, based on an operation of a user such that the apparatus to be controlled operates in accordance with force tactile sensation during the operation of the user; a parameter acquirer for acquiring a control parameter that is used for control of the operation controller; and a provider for comparably providing, to a second user, a first control parameter that is acquired by the parameter acquirer in a case where the operation controller controls an operation of the apparatus to be controlled, based on an operation of a first user and a second control parameter that is acquired by the parameter acquirer in a case where the operation controller controls the operation of the apparatus to be controlled, based on an operation of the second user.

Advantageous Effects of Invention

According to the present invention, a learner can be more efficiently assisted to learn movement.

BRIEF DESCRIPTION OF DRAWINGS

FIG. 5 is a schematic diagram showing an example of information that is stored as the result of sampling the movement.

FIG. 7 is a schematic diagram showing a basic structure of the learning assistance apparatus 1.

DESCRIPTION OF EMBODIMENTS

Figure 1:
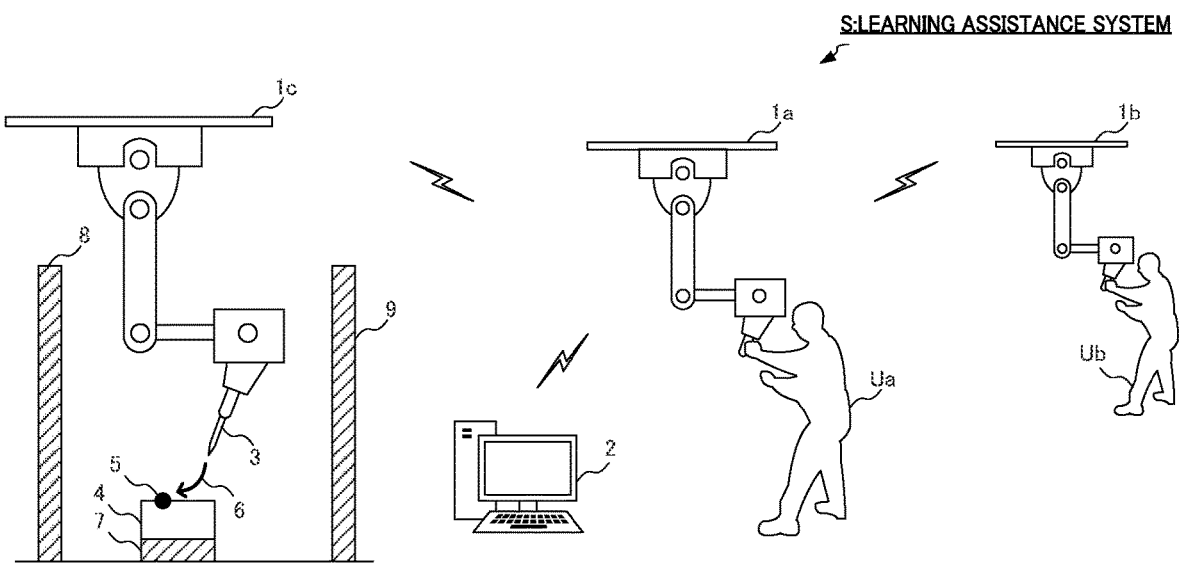
FIG. 1 is a block diagram illustrating the entire structure of a learning assistance system S according to the present embodiment.

An example of an embodiment of the present invention will hereinafter be described with reference to the attached drawings.
[System Configuration]
FIG. 1 is a block diagram illustrating the entire structure of a learning assistance system S according to the present embodiment. As illustrated in FIG. 1, the learning assistance system S includes a learning assistance apparatus 1a, a learning assistance apparatus 1b, a learning assistance apparatus 1c, and a terminal 2. The figure also illustrates an end effector 3, a workpiece 4, an imaginary target point 5, an imaginary directional sense of touch 6, an imaginary entry prohibition region 7, an imaginary wall 8, an imaginary wall 9, a user Ua, and a user Ub.

In the case where the learning assistance apparatus 1a, the learning assistance apparatus 1b, and the learning assistance apparatus 1c are not distinguished and are described, the end of reference signs is omitted, and these are referred to merely as the "learning assistance apparatuses 1" in the following description.

The learning assistance apparatuses 1 are connected so as to be capable of communicating with each other. The learning assistance apparatuses 1 and the terminal 2 are connected so as to be capable of communicating with each other. Communication between these apparatuses may comply with a freely selected communication method, and the communication method is not particularly limited. The communication between these apparatuses may be wireless communication, wired communication, or a combination of the wireless communication and the wired communication. In addition, the communication between these apparatuses may be direct communication between the apparatuses, or a relay device, a LAN (Local Area Network), the internet, or a network such as a mobile phone network, not illustrated, may be used.

The learning assistance apparatuses 1 assist a earner who is going to learn movement in a predetermined action by using the learning assistance system S.

In the description below by way of example, it is supposed that the learning assistance apparatuses 1 function by using a robot manipulator that can be remotely operated by a user (that is, teleoperation). It is also supposed that the learner learns movement in an action in which the learning assistance apparatuses 1 are remotely operated by using the learning assistance system. S.

It is supposed that the user Ua corresponding to the learner operates the learning assistance apparatus 1a, the user Ub corresponding to an expert of remote operation with the learning assistance apparatuses 1 operates the learning assistance apparatus 1b, and the learning assistance apparatus 1c carries out work such as processing as the robot manipulator.

The learning assistance apparatuses 1 communicate with each other, and operation control units that are included in the respective learning assistance apparatuses 1 control an operation. Consequently, one operates as a master apparatus (for example, an apparatus that is operated by a user), and another operates as a slave apparatus (for example, an apparatus that carries out the work such as processing as the robot manipulator). In this case, the user performs remote operation by operating the master apparatus while observing the operation of the slave apparatus directly or in, for example, a video. During the remote operation, the operation control units that are included in the learning assistance apparatuses 1 control the operation. Consequently, the operation of the master apparatus is transmitted to the slave apparatus, and a function of feeding back the input of reaction force from an object into the slave apparatus to the master apparatus is fulfilled (that is, a bilateral control function).

Which of the learning assistance apparatuses operates as the master apparatus or the slave apparatus appropriately changes depending on circumstances, and this will be described every time depending on the circumstances.

The learning assistance apparatus 1c includes the end effector 3 for carrying out the work such as processing. The learning assistance apparatus 1c carries out the work such as processing on the workpiece 4 by using the end effector 3. The content of the work such as processing is not particularly limited. For example, the end effector 3 functions as a cutting tool, and the workpiece 4 is cut.

During the work by using the learning assistance apparatus 1c, the imaginary target point 5, the imaginary directional sense of touch 6, the imaginary entry prohibition region 7, the imaginary wall 8, and the imaginary wall 9 are set to assist the user Ua corresponding to the learner to learn the movement. This will be described in detail later.

The terminal 2 provides, for example, a user interface and various kinds of information for assisting the user Ua corresponding to the learner to learn the movement. The terminal 2 provides these by using, for example, a screen on a display that is included in the terminal 2, a sound (such as a warning sound or a voice) that is outputted from a speaker that is included in the terminal 2, or a warning lamp that blinks and that is included in the terminal 2. The terminal 2 includes an input unit such as various buttons, a keyboard, or a touch screen and receives various operation instructions from the user Ua via the input unit. The terminal 2 performs these processes through communication between the terminal 2 and one of the learning assistance apparatuses 1 (here, the learning assistance apparatus 1a) and corporation between these.

An outline of a process of assisting the learner by using the learning assistance system S that has this structure will now be described.

The learning assistance system S controls an apparatus to be controlled (here, each learning assistance apparatus 1) based on the operation of a user (here, control by using the bilateral control function) and causes the apparatus to be controlled to operate in accordance with force tactile sensation during the operation of the user. The learning assistance system S acquires control parameters that are used for the control. The learning assistance system S comparably provides, to a second user, a first control parameter that is acquired in the case where the operation of the apparatus to be controlled is controlled based on the movement of a first user (here, the user Ub corresponding to the expert) and a second control parameter that is acquired in the case where the operation of the apparatus to be controlled is controlled based on the movement of the second user (here, the user Ua corresponding to the learner).

The learning assistance system S thus acquires the control parameters that are used for causing the apparatus to be controlled to operate in accordance with the force tactile sensation during the operation of the user as for both of the first user and the second user and comparably provides the control parameters for the users to the second user. Consequently, the second user can grasp whether movement involving the force tactile sensation differs between the second user and the first user and the degree of the difference.

Accordingly, the learning assistance system S can more efficiently assist the learner to learn the movement.

The learning assistance system S thus carries out the assistance by using the control parameters related to the force tactile sensation and can accordingly solve the problem in that the "learner is assisted to learn the movement merely by using information (for example, the video) that is acquired by visually observing the movement of the expert" regarding the typical technique described above.

[Control on Operation of Apparatus to be Controlled]

The basic principle of the control on the operation of the apparatus to be controlled (here, each learning assistance apparatus 1) according to the present embodiment will now be describe as a premise for assistance in learning movement by using the learning assistance system S described above.

Human-like movements are constituted by the particular functioning of individual joints and the like separately or in combination.

Accordingly, the term "movement" as used in the present embodiment herebelow refers to an integrated function in which the particular "functions" of portions of the human body are realized as constituent elements.

For example, movement (for example, movement for moving each learning assistance apparatus 1 by using a hand) involving operating the learning assistance apparatus 1 corresponds to an integrative function including the functions of, for example, fingers and a wrist of a hand and an arm and a shoulder coupled with these.

(Basic Principle)

The basic principle of the present invention is that any movement can be mathematically represented by three elements: a force origin, a velocity (or position) origin and a conversion representing the movement. Therefore, by control energy from an ideal force origin and an ideal velocity (position) origin, which have a duality relationship, being supplied to a control object system in accordance with a set of variables defined by a conversion and a reverse conversion, a sampled human body movement may be constituted, reconstructed and/or amplified to reversibly and automatically realize (reproduce) the body movement.

Figure 2:
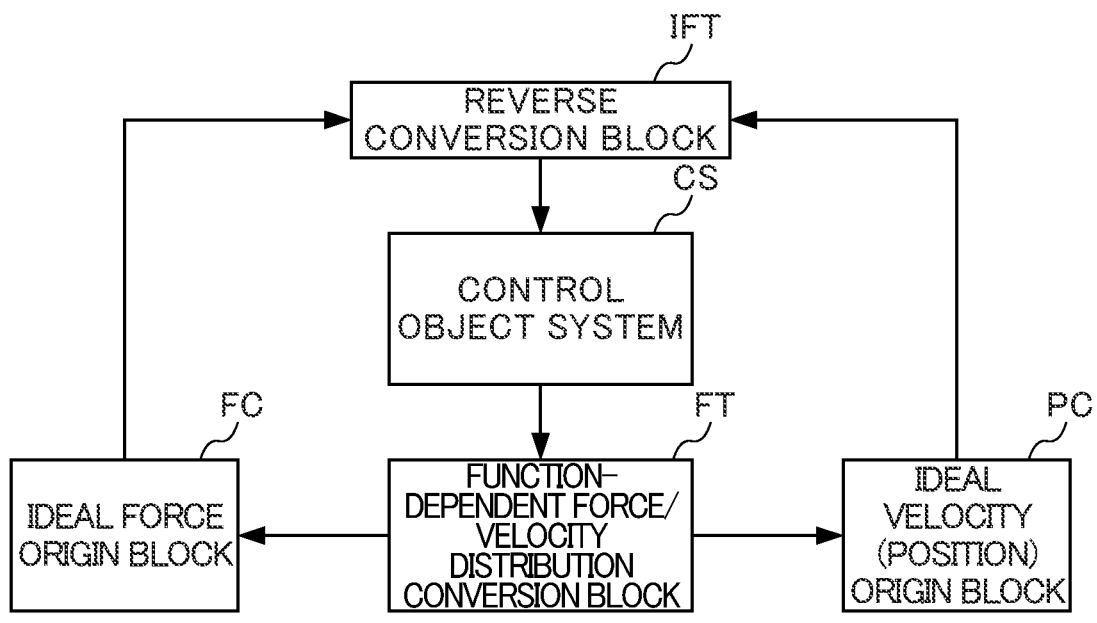
FIG. 2 is a schematic diagram showing an overview of the basic principle of controlling the operation of the apparatus to be controlled.

FIG. 2 is a schematic diagram showing an overview of the basic principle of controlling the operation of the apparatus to be controlled in this embodiment.

The basic principle as shown in FIG. 2 represents control rules of an actuator that can be used for realizing human-like movements. An operation of the actuator may be determined by performing computations in at least one of a position (or velocity) domain and a force domain, using a current position of the actuator (here, actuator that are included in the learning assistance apparatus 1) as an input.

That is, the basic principle of controlling the operation of the apparatus to be controlled in this embodiment is represented as control rules including a control object system CS, a function-dependent force/velocity distribution conversion block FT, at least one of an ideal force origin block FC and an ideal velocity (position) origin block PC, and a reverse conversion block IFT.

The control object system CS is a robot (here, the learning assistance apparatus 1) that operates through an actuator/actuators. The control object system CS controls each actuator on the basis of acceleration or the like.

The control object system CS realizes functions of one or plural portions of a human body. Provided the control object system CS employs control rules for realizing these functions, the concrete structure of the control object system CS does not necessarily need to be in a form that resembles the human body.

For example, the control object system CS may be a robot that moves a link in a one-dimensional sliding operation with an actuator.

The function-dependent force/velocity distribution conversion block FT is a block that defines a conversion of control energy in the velocity (position) and force domains, which is specified in accordance with a function of the control object system CS.

Specifically, the function-dependent force/velocity distribution conversion block FT defines a coordinate conversion whose inputs are a value serving as a reference for the function of the control object system CS (a reference value) and the current position of an actuator.

The coordinate conversion is, generally speaking, a conversion of an input vector whose elements are a reference value of velocity (position) and a current velocity (position) to an output vector constituted with a velocity (position) for calculating a control target value of velocity (position), and a conversion of an input vector whose elements are a reference value of force and a current force to an output vector constituted with a force for calculating a control target value of force.

To be specific, the coordinate conversion by the function-dependent force/velocity distribution conversion block FT can be generalized and expressed as in the following Expressions (1) and (2).

[Math. 1]

$$
\begin{pmatrix} \dot{x}_1 \\ \dot{x}_2 \\ \vdots \\ \dot{x}_{n-1} \\ \dot{x}_n \end{pmatrix} = \begin{pmatrix} h_{1a} & h_{1b} & \cdots & h_{1(m-1)} & h_{1m} \\ h_{2a} & h_{2b} & \cdots & h_{2(m-1)} & h_{2m} \\ \vdots & \vdots & \ddots & \vdots & \vdots \\ h_{(n-1)a} & h_{(n-1)b} & \cdots & h_{(n-1)(m-1)} & h_{(n-1)m} \\ h_{na} & h_{nb} & \cdots & h_{n(m-1)} & h_{nm} \end{pmatrix} \begin{pmatrix} \dot{x}_a \\ \dot{x}_b \\ \vdots \\ \dot{x}_{m-1} \\ \dot{x}_m \end{pmatrix} \quad (1)
$$

$$
\begin{pmatrix} f_1 \\ f_2 \\ \vdots \\ f_{n-1} \\ f_n \end{pmatrix} = \begin{pmatrix} h_{1a} & h_{1b} & \cdots & h_{1(m-1)} & h_{1m} \\ h_{2a} & h_{2b} & \cdots & h_{2(m-1)} & h_{2m} \\ \vdots & \vdots & \ddots & \vdots & \vdots \\ h_{(n-1)a} & h_{(n-1)b} & \cdots & h_{(n-1)(m-1)} & h_{(n-1)m} \\ h_{na} & h_{nb} & \cdots & h_{n(m-1)} & h_{nm} \end{pmatrix} \begin{pmatrix} f_a \\ f_b \\ \vdots \\ f_{m-1} \\ f_m \end{pmatrix} \quad (2)
$$

In Expression (1), $x'_1$ to $x'_n$ (n is an integer that is at least 1) represent velocity vectors for calculating a state value of velocity, $x'_a$ to $x'_m$ (m is an integer that is at least 1) represent vectors whose elements are a reference value and a velocity based on an action of the actuator (a velocity of a moving element of the actuator or a velocity of an object being moved by the actuator), and $h_{1a}$ to $h_{nm}$ represent elements of a conversion matrix representing the function.

In Expression (2), $f''_1$ to $f''_n$ (n is an integer that at least 1) represent force vectors for calculating a state value of force, and $f''_a$ to $f''_m$ (m is an integer that is at least 1) represent vectors whose elements are a reference value and a force based on an action of the actuator (a force of a moving element of the actuator or a force of the object being moved by the actuator).

By the coordinate conversion by the function-dependent force/velocity distribution conversion block FT being specified in accordance with the function to be realized, various movements may be realized and movements may be reproduced with scaling.

That is, in the basic principle of controlling the operation of the apparatus to be controlled in this embodiment, the function-dependent force/velocity distribution conversion block FT "converts" a variable of an actuator unit (a variable in real space) to a set of variables (variables in virtual space) for the whole system representing the function to be realized, and distributes control energy to velocity (position) control energy and force control energy.

Therefore, in contrast to a case in which control is performed using unmodified variables of actuator units (variables in real space), the velocity (position) control energy and force control energy may be given separately.

The ideal force origin block FC is a block that performs computations in the force domain in accordance with the coordinate conversion defined by the function-dependent force/velocity distribution conversion block FT.

The ideal force origin block FC sets a target value relating to force in performing a computation on the basis of the coordinate conversion defined by the function-dependent force/velocity distribution conversion block FT.

The target value is set as a fixed value or a variable value, depending on the function being realized.

For example, if the function being realized is the same as the function represented by the reference value, the target value is set to zero, and if scaling is to be applied, information representing the function being reproduced is set to a magnified or reduced value.

The ideal velocity (position) origin block PC is a block that performs computations in the velocity (position) domain in accordance with the coordinate conversion defined by the function-dependent force/velocity distribution conversion block FT.

The ideal velocity (position) origin block PC sets a target value relating to velocity (position) in performing a computation on the basis of the coordinate conversion defined by the function-dependent force/velocity distribution conversion block FT.

The target value is set as a fixed value or a variable value, depending on the function being realized.

For example, if the function being realized is the same as the function represented by the reference value, the target value is set to zero, and if scaling is to be applied, information representing the function being reproduced is set to a magnified or reduced value.

The reverse conversion block IFT a block that converts values in the velocity (position) and force domains to values in an input domain for the control object system CS (for example, voltage values, current values or the like).

According to the basic principle, when position information of an actuator of the control object system CS is inputted to the function-dependent force/velocity distribution conversion block FT, the function-dependent force/velocity distribution conversion block FT uses velocity (position) and force information obtained on the basis of this position information and applies respective control rules according to the function in the position and force domains.

A force according to the function is computed at the ideal force origin block FC, a velocity (position) according to the function is computed at the ideal velocity (position) origin block PC, and control energy is allocated to each of the force and velocity (position).

Computation results from the ideal force origin block FC and the ideal velocity (position) origin block PC are information representing control targets of the control object system CS. These computed values are converted to actuator input values by the reverse conversion block IFT and the actuator input values are inputted to the control object system CS.

As a result, the actuator of the control object system CS executes an operation corresponding to the function defined by the function-dependent force/velocity distribution conversion block FT and the robot operation that is the objective is realized.

Thus, in the present invention, a human-like movement by a robot (here, each learning assistance apparatus 1) may be more appropriately realized.

(Defined Function Examples)

Now, specific examples of functions defined by the function-dependent force/velocity distribution conversion block FT are described.

The function-dependent force/velocity distribution conversion block FT defines a coordinate conversion whose objects are a velocity (position) and force obtained on the basis of a current position of an actuator (a conversion from real space to a virtual space according to the function being realized).

At the function-dependent force/velocity distribution conversion block FT, the inputs are a velocity (position) and force derived from the current position and a velocity (position) and force that are reference values of the function; the function-dependent force/velocity distribution conversion block FT applies the control rules for each of velocity (position) and force in terms of accelerations.

That is, a force of the actuator is expressed as the product of mass and acceleration, and a velocity (position) of the actuator is expressed by integrating acceleration.

Therefore, the current position of the actuator may be acquired and the function that is the objective may be realized by controlling velocities (positions) and forces via the acceleration domain.

Herebelow, concrete examples of various functions are described.

(Force-Sense Transmission Function)

Figure 3:
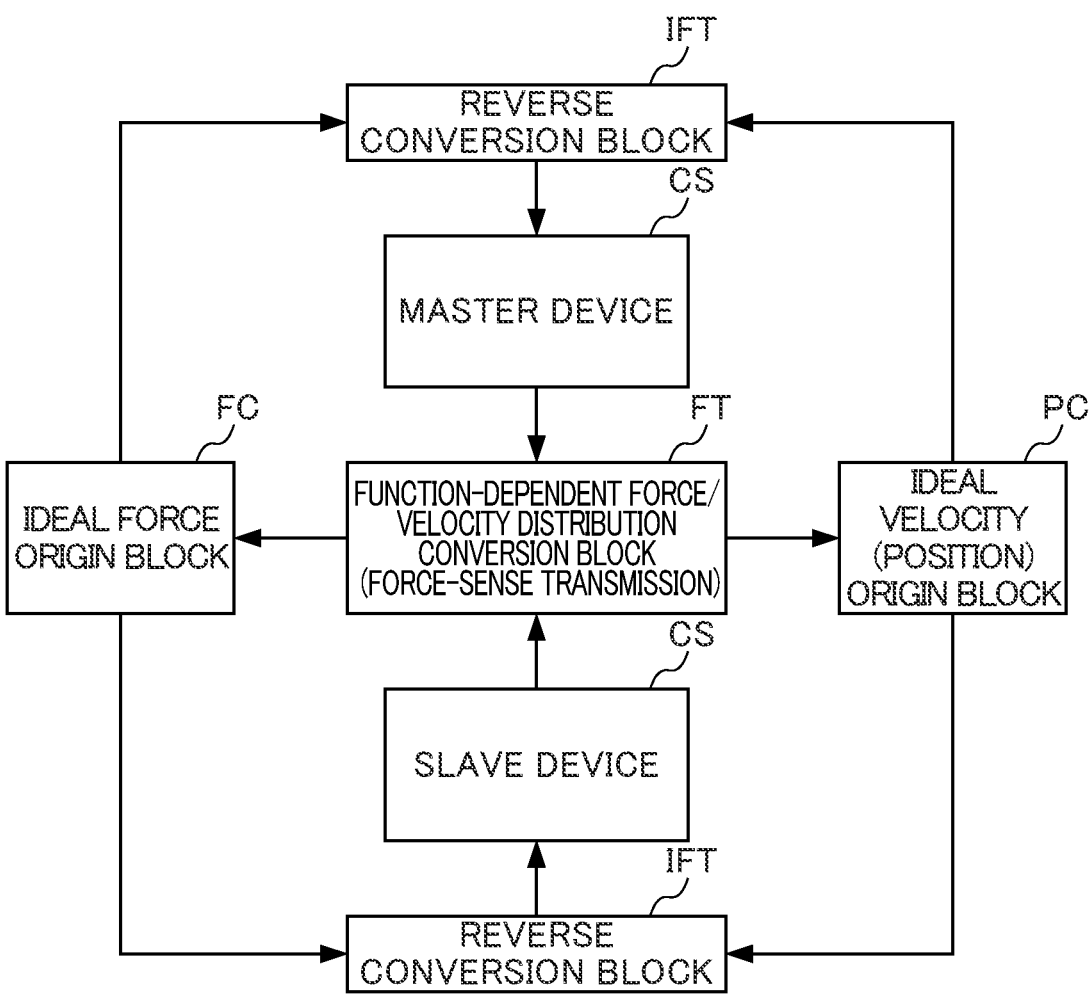
FIG. 3 is a schematic diagram showing an overview of control when a force-sense transmission function is defined.

FIG. 3 is a schematic diagram showing an overview of control when a force-sense transmission function is defined at the function-dependent force/velocity distribution conversion block FT.

Figure 4:
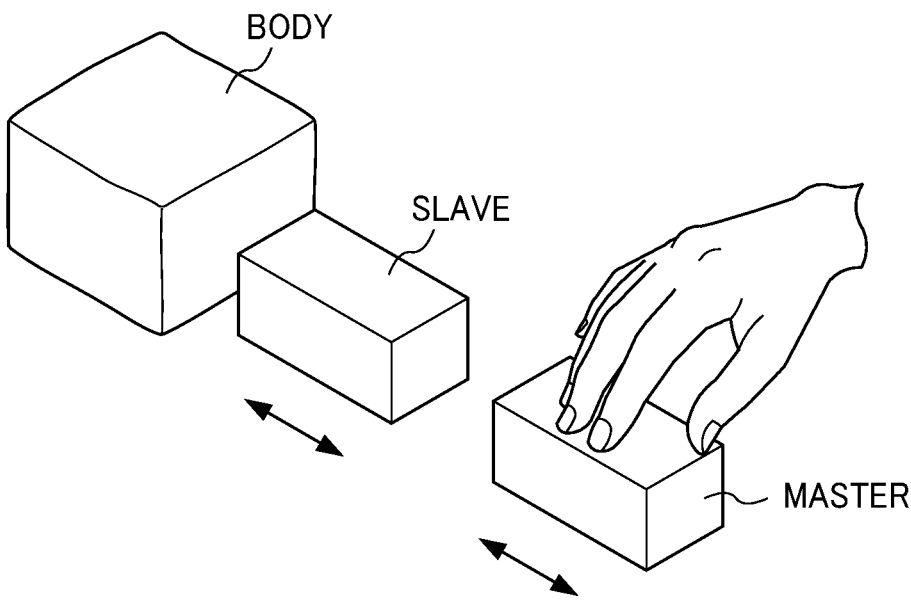
FIG. 4 is a schematic diagram showing an overview of a master/slave system.

FIG. 4 is a schematic diagram showing an overview of a master/slave system that includes a master device (for example, the any learning assistance apparatus 1) and a slave device (for example, the other learning assistance apparatus 1) at which the force-sense transmission function is employed.

As shown in FIG. 3, a function that transfers an operation of the master device to the slave device and that feeds back to the master device a reaction force from a body (for example, the workpiece 4) against the slave device (a bilateral control function) may be realized as the function defined by the function-dependent force/velocity distribution conversion block FT.

In this case, the coordinate conversion by the function-dependent force/velocity distribution conversion block FT can be expressed as in the following Expressions (3) and (4).

[Math. 2]

$$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \tag{3}$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \tag{4}$$

In Expression (3), $x'_p$ represents a velocity for calculating a state value of velocity (position) and $x'_f$ represents a velocity relating to a state value of force.

Further, $x'_m$ represents a reference value (of an input from the master device) of velocity (a differential value of the current position of the master device) and $x'_s$ represents a current velocity (a differential value of the current position) of the slave device.

In expression (4), $f_p$ represents a force relating to the state value of velocity (position) and $f_f$ represents a force for calculating the state value of force.

Further, $f_m$ represents a reference value (of an input from the master device) of force and $f_s$ represents a current force of the slave device.

(Function of Sampling Movement)

A function of sampling human movement that is achieved according to the present embodiment will now be described in detail.

The "basic principle" described above enables the human movement to be sampled in a manner in which a robot (for example, a robot that has a mechanism corresponding to a function of a human body) that has a predetermined mechanism is prepared, the robot follows the human movement, and the operation of the robot at this time is detected in time series.

For example, in the case of the learning assistance apparatuses 1 illustrated in FIG. 1, multiple actuators (illustrated in FIG. 7 described later) that are included in the learning assistance apparatuses 1 move so as to follow movement when a human hand moves to operate the learning assistance apparatuses 1, the positions of the actuators at this time are detected in time series by using multiple sensors (illustrated in FIG. 7 described later), and the positions are stored in a storage device.

In this case, values (for example, values in a left-hand member in the expression (4) calculated in time series) for deriving a state value that is acquired as the result of coordinate conversion by using a function-dependent force/velocity distribution conversion block FT may be stored in the storage device instead of the result of detection of the positions of the actuators.

FIG. 5 schematically illustrates an example of information that is stored as the result of sampling the movement where FIG. 5($a$) illustrates the case where the positions of the multiple actuators (here, actuators A1 to A4) are stored in time series, and FIG. 5($b$) illustrates the case where the result of coordinate conversion of the expression (4) is stored in time series.

Referring to FIG. 5($a$), as for, for example, the actuator A1, positions such as a position p1 at a time t1, a position p2 at a time t2, a position p3 at a time t3 are stored in time series.

Referring to FIG. 5($b$), as for, for example, the result of coordinate conversion x"a1, values such as the result q1 of coordinate conversion at the time t1, the result q2 of coordinate conversion at the time t2, the result q3 of coordinate conversion at the time t3 are stored in time series.

Consequently, once a person actually makes predetermined movement in a predetermined action, a robot can subsequently reproduce an operation, for example, for learning and reproducing the predetermined movement without making the predetermined movement.

(Scaling Function)

The force-sense transmission function described above may realize scaling functions of position, force and time.

The term "scaling function" means a function that magnifies or reduces the scale of positions, forces or times of outputs of controls that serve as a reference.

With a scaling function, for example, the magnitude of movements of a master device may be reduced and reproduced by a slave device, the strength (force) of movements of a master device may be strengthened and reproduced by a slave device, or the velocity of movements of a master device may be lowered and reproduced by a slave device.

By using a scaling function on information of at least one of positions and forces stored in a storage device, for example, the magnitudes of stored movements may be reduced and reproduced by a slave device or strengths (forces) of stored movements may be strengthened and reproduced by a slave device.

Below, a structural example for realizing a scaling function is described.

(Force-Sense Transmission Function with Scaling)

A coordinate conversion at the function-dependent force/velocity distribution conversion block FT according to FIG. 3 for a case of realizing a force-sense transmission function with scaling can be expressed as in the following Expressions (5) and (6).

[Math. 3]

$$\begin{pmatrix} \dot{x}_p \\ \dot{x}_f \end{pmatrix} = \begin{pmatrix} 1 & -\alpha \\ 1 & \beta \end{pmatrix} \begin{pmatrix} \dot{x}_m \\ \dot{x}_s \end{pmatrix} \tag{5}$$

$$\begin{pmatrix} f_p \\ f_f \end{pmatrix} = \begin{pmatrix} 1 & -\alpha \\ 1 & \beta \end{pmatrix} \begin{pmatrix} f_m \\ f_s \end{pmatrix} \tag{6}$$

With the coordinate conversion shown in Expression (5) and Expression (6), positions of a slave device are magnified by $\alpha$ ($\alpha$ is a positive number) and transmitted to a master device, and forces at the slave device are magnified by $\beta$ ($\beta$ is a positive number) and transmitted to the master device.

This scaling function makes, for example, delicate tasks such as surgical operations, microassembly and the like and large-scale tasks such as construction work, extravehicular activities in space and the like possible.

(Force-Sense Transmission Function with Position Limiting by Scaling)

A coordinate conversion at the function-dependent force/velocity distribution conversion block FT according to FIG. 3 for a case of realizing a force-sense transmission function with position limiting by scaling can be expressed as in the following Expressions (7) to (10).

When realizing this function, it is appropriate to take account of the following conditions:

Continuity even in the velocity dimension (a Jacobian matrix is required)

Positions beyond a limit are a monotonically increasing function of an original position (stability is required)

If $x_s$ < a, then $x_s = x_{shat}$ or $x_s \approx x_{shat}$ ($x_{shat}$ is a parameter included in Expression (14) and Expression (15) at the function-dependent force/velocity distribution conversion block FT (control performance in a stable region must be assured)

There is a saturation function (position-limiting must be realized) As an alternative function that satisfies these conditions, an arctangent function may be employed.

[Math. 4]

IF $Xs < a$, $$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \tag{7}$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \tag{8}$$

IF $Xs \geq a$, $$\begin{pmatrix} \dot{x}_p \\ \dot{x}_f \end{pmatrix} = \begin{pmatrix} 1 & -e^{b(\hat{x}_s - a)} \\ 1 & e^{b(\hat{x}_s - a)} \end{pmatrix} \begin{pmatrix} \dot{x}_m \\ \dot{x}_s \end{pmatrix} \tag{9}$$

$$\begin{pmatrix} f_p \\ f_f \end{pmatrix} = \begin{pmatrix} 1 & -e^{b(\hat{x}_s - a)} \\ 1 & e^{b(\hat{x}_s - a)} \end{pmatrix} \begin{pmatrix} f_m \\ f_s \end{pmatrix} \tag{10}$$

If the coordinate conversions shown in Expression (7) to Expression (10) are used, then when the position of the slave device is less than a, the coordinate conversions in Expressions (7) and (8) are employed. Thus, the slave device is controlled to the same position as the master device.

On the other hand, when the position of the slave device is at least a, the coordinate conversions in Expressions (9) and (10) are employed. Thus, the scaling function is active and the slave device is controlled such that its position does not go beyond (1/b+a).

This scaling function makes, for example, protecting organs in surgical operations and avoiding breakage of physical bodies possible.

(Force-Sense Transmission Function Using Scaling in Frequency Ranges)

Figure 6:
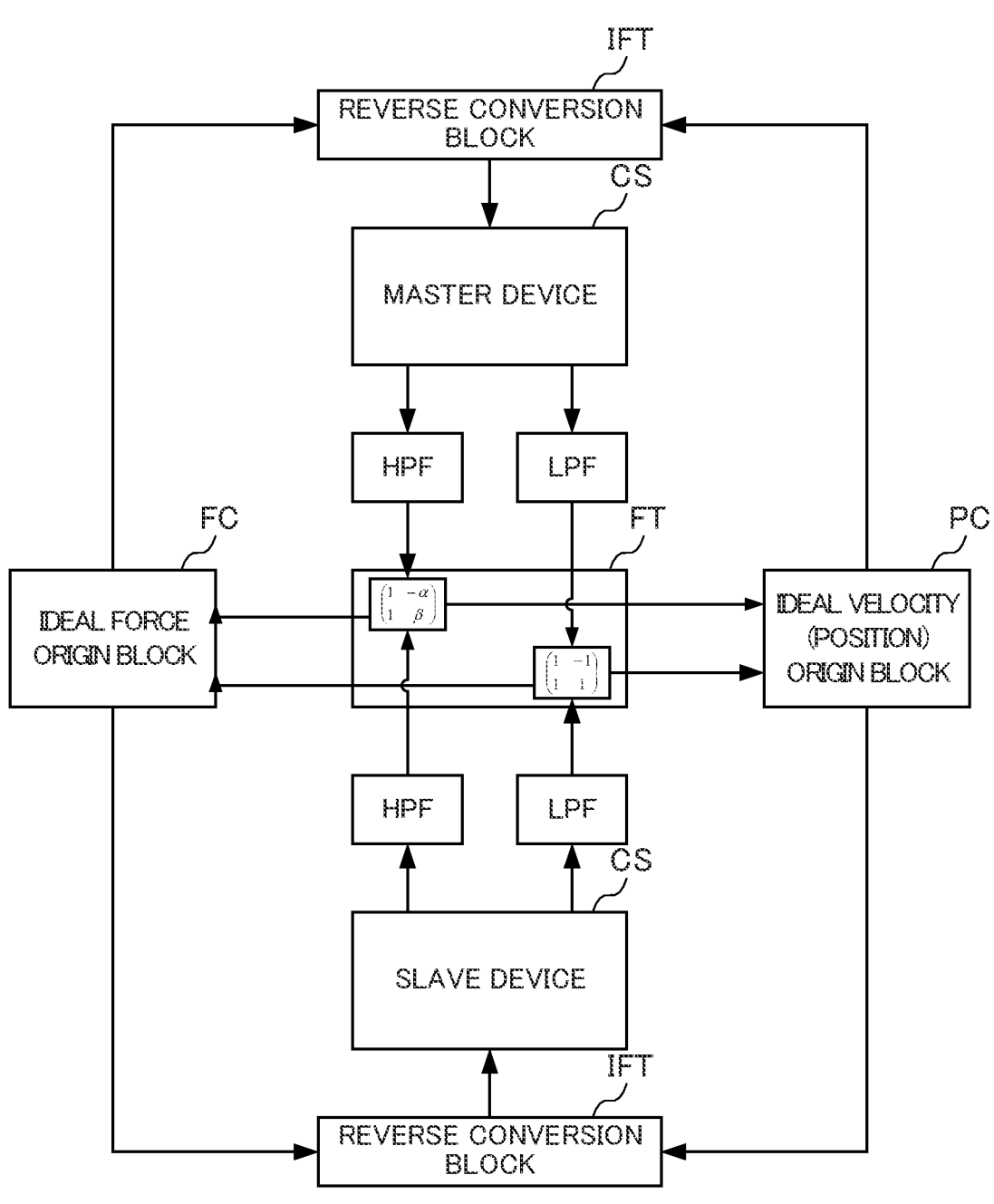
FIG. 6 is a schematic diagram showing an overview of control of a force-sense transmission function that uses scaling in frequency ranges.

FIG. 6 is a schematic diagram showing an overview of controlling the force-sense transmission function using scaling in frequency ranges.

In FIG. 6, the outputs of a master device and a slave device are respectively passed through a high-pass filter (HPF) and a low-pass filter (LPF), and then inputted to the function-dependent force/velocity distribution conversion block FT.

In the function-dependent force/velocity distribution conversion block FT, a coordinate conversion for a high-frequency region is applied to the outputs of the master device and slave device that have passed through the high-pass filter, and a coordinate conversion for a low-frequency region is applied to the outputs of the master device and slave device that have passed through the low-pass filter.

That is, the function-dependent force/velocity distribution conversion block FT splits the inputs from the master device and the slave device into signals in the high-frequency region and the low-frequency region and applies coordinate conversions corresponding to the respective frequency regions.

As shown in FIG. 6, the coordinate conversions at the function-dependent force/velocity distribution conversion block FT for a case of realizing a force-sense transmission function using scaling in frequency ranges can be expressed as in the following Expressions (11) to (14).

[Math. 5]

FOR THE LOW–FREQUENCY REGION, $$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \tag{11}$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \tag{12}$$

FOR THE HIGH–FREQUENCY REGION, $$\begin{pmatrix} \dot{x}_p \\ \dot{x}_f \end{pmatrix} = \begin{pmatrix} 1 & -\alpha \\ 1 & \beta \end{pmatrix} \begin{pmatrix} \dot{x}_m \\ \dot{x}_s \end{pmatrix} \tag{13}$$

$$\begin{pmatrix} f_p \\ f_f \end{pmatrix} = \begin{pmatrix} 1 & -\alpha \\ 1 & \beta \end{pmatrix} \begin{pmatrix} f_m \\ f_s \end{pmatrix} \tag{14}$$

If the coordinate conversions shown in Expression (11) to Expression (14) are used, the coordinate conversions in Expressions (11) and (12) are employed for the low-frequency region. Thus, the slave device is controlled to the same position as the master device. The coordinate conversions in Expressions (13) and (14) are employed in the high-frequency region. Thus, positions of the slave device are magnified by α (α is a positive number) and transmitted to the master device, and forces at the slave device are magnified by β (β is a positive number) and transmitted to the master device.

By this scaling function, a sensation when, for example, the slave device passes through or breaks a body is strengthened and transmitted to the master device.

(Reproducing a Function Using Time Scaling)

In reproduction of a function with the learning assistance apparatus 1, time scaling may be realized by applying thinning to information representing the function that has been learned and stored (for example, the time series of data representing sampling results of movements that are shown in FIG. 5A and FIG. 5B), or by specifying target values by interpolation or the like.

To be specific, a stored function (operation) may be reproduced at a higher velocity by thinning information representing the function that has been learned and stored and then using the thinned information as target values of computation at the ideal force origin block FC or the ideal velocity (position) origin block PC.

Similarly, a stored function (operation) may be reproduced at a lower velocity by interpolating information representing the function that has been learned and stored and then using the interpolated information as target values.

Accordingly, if a stored function (operation) is to be reproduced at a higher velocity, a slow and precise operation may be performed at the time of movement sampling. Thus, a fast and precise operation may be performed at the time of reproduction.

Furthermore, if a stored function (operation) is reproduced at a lower velocity, an operation that is usually carried out quickly may be reproduced slowly. For example, in rehabilitation of patients suffering from the after-effects of injuries or the like, training operations may be reproduced in accordance with the patients' conditions.

[Structure of Learning Assistance Apparatus]

Figure 7:
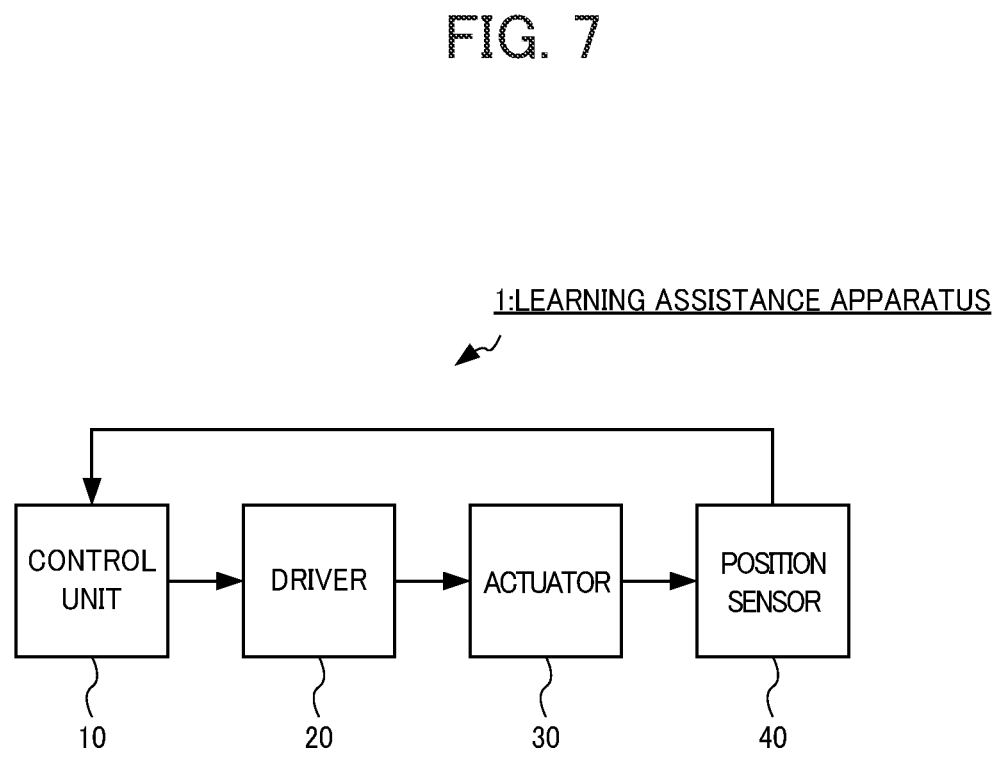

The structure of each learning assistance apparatus 1 will now be described with reference to FIG. 7. FIG. 7 schematically illustrates a basic structure of the learning assistance apparatus 1.

As illustrated in FIG. 7, the learning assistance apparatus 1 includes a control unit 10, a driver 20, an actuator 30, and a position sensor 40.

The learning assistance apparatus 1 operates as the master apparatus or the slave apparatus as described above with reference to FIG. 1. In the case where the learning assistance apparatus 1 operates as the master apparatus or the slave apparatus, the learning assistance apparatus 1 receives the result of detection of the position sensor 40 that is installed on the actuator 30 of another learning assistance apparatus 1 and operates depending on a function.

The function of the learning assistance apparatus 1 can be changed by changing the coordinate conversion that is defined by the function-dependent force/velocity distribution conversion block FT that is provide by the control unit 10 as described above.

The control unit 10 controls the entire learning assistance apparatus 1 and includes an information-processing apparatus that includes a processor such as a CPU (Central Processing Unit) and a storage device such as a memory or a hard disk.

The control unit 10 has functions of the function-dependent force/velocity distribution conversion block FT, an ideal force origin block FC, an ideal velocity (position) origin block PC, and a reverse conversion block IFT in FIG. 2 and FIG. 3. The control unit 10 implements control for the operation of the master apparatus or the slave apparatus by using these functions.

For this purpose, the control unit 10 acquires a value (referred to below as a "reference value") serving as a reference for the function of the learning assistance apparatus 1. For example, in the case where the apparatus operates as the master apparatus or the slave apparatus, the reference value is a detection value that is outputted in time series from the position sensor 40 that is installed on the actuator 30 of the other learning assistance apparatus 1. In the case where the control unit 10 thus acquires the detection value in time series from the other learning assistance apparatus 1 in real time as the reference value, the control unit 10 can include a communication interface (a communication I/F).

In the case where the detection value in time series from the other learning assistance apparatus 1 is stored and is sequentially read and acquired by the control unit 10 as the reference value to fulfill the "function of sampling movement" described above, the control unit 10 can include a storage device such as a memory or a hard disk.

That is, the control unit 10 receives the detection value that is detected in time series by the position sensor 40 of the other learning assistance apparatus 1 as the reference value. The detection value in time series represents the operation of the other learning assistance apparatus 1. For information about force and velocity (position) derived from the inputted detection value (position), the control unit 10 uses the coordinate conversion that is set depending on the function.

For velocity (position) for deriving the state value of the velocity (position) that is acquired by the coordinate conversion, the control unit 10 makes a calculation in a velocity (position) domain. Similarly, for force for deriving the state value of the force that is acquired by the coordinate conversion, the control unit 10 makes a calculation in a force domain. For the result of calculation in the velocity (position) domain and the result of calculation in the force domain, the control unit 10 performs a process of unifying a dimension into, for example, acceleration, and reverse conversion of the coordinate conversion that is set depending on the function is carried out. Consequently, the control unit 10 converts the result of calculation in the velocity (position) domain and the result of calculation in the force domain into values in a domain of input into the actuator 30.

The control unit 10 functions as functional blocks for assisting the learner to learn movement. The functional blocks will be described later with reference to FIG. 8.

The driver 20 converts the values in the domain of inputs to the actuator, to which the reverse conversion has been performed by the control unit 10, to specific control command values for the actuator 30 (voltage values, current values or the like), and outputs these control command values to the actuator 30.

The actuator 30 performs driving in response to the control command values inputted from the driver 20, thus controlling a position of a control object.

The position sensor 40 detects positions of the control object controlled by the actuator 30 and outputs the detection values to the control unit 10.

Thus, the learning assistance apparatus with this structure converts velocities (positions) and forces obtained from the positions of the control object detected by the position sensor 40 to state values in the velocity (position) domain and the force domain by the coordinate conversion corresponding to the function.

Hence, control energy is distributed to each of velocity (position) and force in accordance with the function.

Then, the reverse conversion is performed on the respective state values to find control command values, and the actuator 30 is driven by the driver 20 in response to these control command values.

Thus, by detecting positions of the control object, the learning assistance apparatus 1 may calculate the state values of velocity (position) and force that are necessary for realizing the function that is the objective, and by driving the actuator 30 on the basis of these state values, the learning assistance apparatus 1 may control the position and force of the control object into a state that is an objective.

Moreover, by replacing the coordinate conversion corresponding to a function in the control unit 10, the learning assistance apparatus 1 may realize different functions.

For example, various functions may be realized by the learning assistance apparatus 1, by coordinate conversions corresponding to plural functions being stored in accordance with the respective functions in a storage device provided at the learning assistance apparatus 1 and the coordinate conversion corresponding to one of the functions being selected in accordance with an objective.

For example, in the case where one of the functions described above is fulfilled as a "force/tactile sensation transmission function", the learning assistance apparatus 1 can use the reference value that is inputted into the control unit 10 as each of acquired values of the force and position that are inputted in real time from the other learning assistance apparatus 1. In this case, the learning assistance apparatus 1 can be controlled in conjunction with the operation of the other learning assistance apparatus 1 in real time. That is, in this case, as for the control unit 10, the coordinate conversion is defined as the expression (2), control is implemented such that the difference between the position of the actuator 30 of the learning assistance apparatus 1 that operates as the master apparatus and the position of the actuator 30 of the learning assistance apparatus 1 that operates as the slave apparatus becomes zero.

In the case where one of the functions described above is fulfilled as the "force/tactile sensation transmission function", the force tactile sensation when an operator operates the actuator 30 of the learning assistance apparatus 1 that operates as the master apparatus is transmitted to the slave apparatus, and reaction force that acts on the actuator 30 of the learning assistance apparatus 1 that operates as the slave apparatus from an object (for example, the workpiece 4) is fed back to the master apparatus. Consequently, the operation of the learning assistance apparatus 1 that operates as the master apparatus is accurately reproduced by the learning assistance apparatus 1 that operates as the slave apparatus, and the reaction force that is inputted from the object into the learning assistance apparatus 1 that operates as the slave apparatus can be accurately transmitted to the learning assistance apparatus 1 that operates as the master apparatus.

For example, in the case where one of the functions described above is fulfilled as the "function of sampling movement", the learning assistance apparatus 1 can use the reference value that is inputted into the control unit 10 as each of the acquired values of the force and position of the other learning assistance apparatus 1 that are acquired in advance and that are stored in time series. In this case, the function of the learning assistance apparatus 1 can be fulfilled based on the operation of the other learning assistance apparatus 1 that is prepared in advance. That is, the learning assistance apparatus 1 can reproduce a target function without the other learning assistance apparatus 1.

For example, in the case where one of the functions described above is fulfilled as a "scaling function", the scaling function of the learning assistance apparatus 1 enables the degree of the movement of the learning assistance apparatus 1 that operates as the master apparatus to be reduced to reproduce this by using the learning assistance apparatus 1 that operates as the slave apparatus, enables the intensity (force) of the movement of the learning assistance apparatus 1 that operates as the master apparatus to be increased to reproduce this by using the learning assistance apparatus 1 that operates as the slave apparatus, or enables the velocity of the movement of the learning assistance apparatus 1 that operates as the master apparatus to be reduced to reproduce this by using the learning assistance apparatus 1 that operates as the slave apparatus.

For example, in the case where one of the functions described above is fulfilled as the "function of sampling movement" and one of the functions described above is fulfilled as the "scaling function", the learning assistance apparatus 1 uses the scaling function for information about at least the position or force that is stored in the storage device by using the function of sampling movement. For example, this enables the degree of the movement that is stored to be reduced to reproduce this by using the learning assistance apparatus 1 that operates as the slave apparatus or enables the intensity (force) of the movement that is stored to be increased to reproduce this by using the learning assistance apparatus 1 that operates as the slave apparatus.

The learning assistance apparatus 1 that operates as master apparatus or the slave apparatus in the above manner performs "learning assistance processing".

The learning assistance processing includes a series of processes for assisting the learner who is going to learn movement in a predetermined action.

Figure 8:
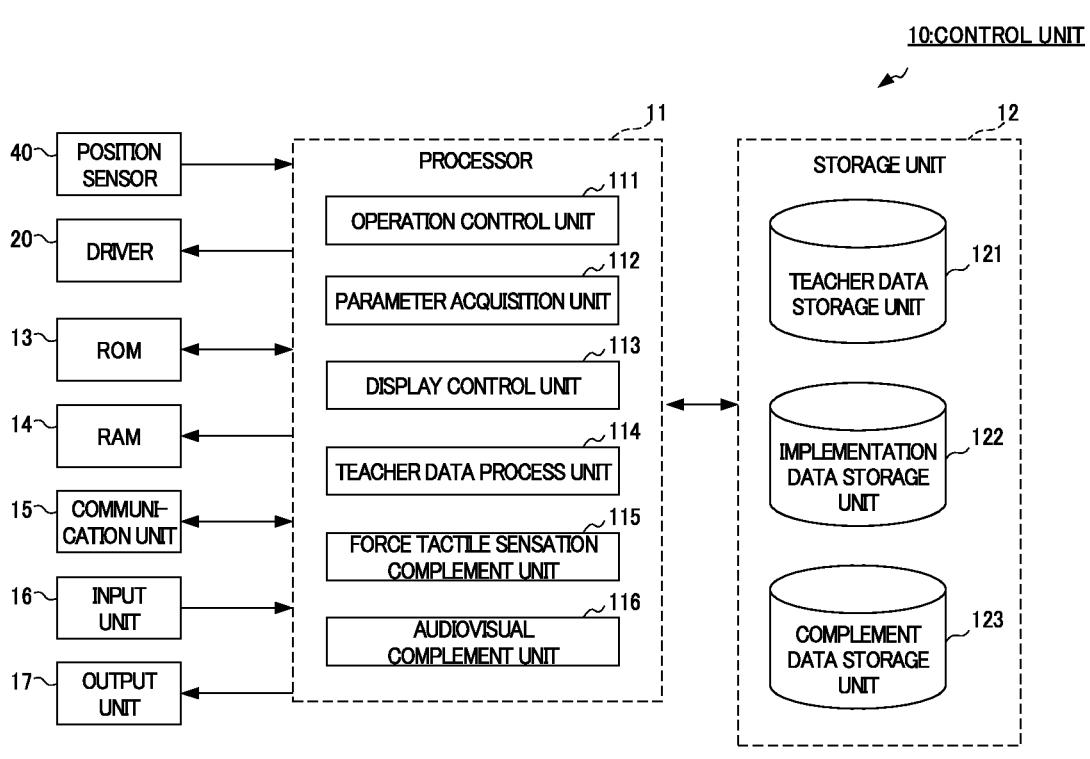
FIG. 8 is a block diagram illustrating the functional blocks and hardware for performing the learning assistance processing.

FIG. 8 is a block diagram illustrating the functional blocks and hardware for performing the learning assistance processing. As illustrated in FIG. 8, the control unit 10 includes a processor 11, a storage unit 12, a ROM 13, a RAM 14, a communication unit 15, an input unit 16, and an output unit 17. As illustrated in FIG. 7, the driver 20 and the position sensor 40 are connected to the control unit 10. These components are connected by using a signal line and transmit and receive a signal to and from each other.

The processor 11 performs various processes in accordance with a program that is stored in the ROM 13 or a program that is loaded from the storage unit 12 into the RAM 14. The RAM 14 appropriately stores, for example, data that is needed for the processor 11 to perform the various processes. The storage unit 12 includes a semiconductor memory such as a DRAM (Dynamic Random Access Memory) and stores various kinds of data.

The communication unit 15 controls communication between the processor 11 and another apparatus (for example, the other learning assistance apparatus 1 or the terminal 2). The input unit 16 includes various buttons and a touch screen, or external input devices such as a mouse and a keyboard and receives various kinds of information depending on an instruction operation of a user. The output unit 17 includes, for example, a display or a speaker and outputs an image or a voice.

In the case where the learning assistance processing is performed with such hardware configuration, as illustrated in FIG. 8, the processor 11 functions as an operation control unit 111, a parameter acquisition unit 112, a display control unit 113, a teacher data process unit 114, a force tactile sensation complement unit 115, and an audiovisual complement unit 116.

In the case where the learning assistance processing is performed with such hardware configuration, as illustrated in FIG. 8, a teacher data storage unit 121, an implementation data storage unit 122, and a complement data storage unit 123 are set in a region of the storage unit 12.

The functional blocks appropriately transmit and receive data that is needed to perform the processing with an appropriate timing also in cases that are not particularly mentioned below.

The operation control unit 111 controls the operation of the learning assistance apparatus 1 that operates as the master apparatus or the slave apparatus by using the force/tactile sensation transmission function in the above manner. That is, the operation control unit 111 fulfils the functions of the function-dependent force/velocity distribution conversion block FT, the ideal force origin block FC, and the ideal velocity (position) origin block PC, and the reverse conversion block IFT in FIG. 2 and FIG. 3. In this case, the operation control unit 111 controls the operation by using the force/tactile sensation transmission function with the function-dependent force/velocity distribution conversion block FT defining the force/tactile sensation transmission function as described above with reference to FIG. 3.

The operation control unit 111 controls the operation by using the force/tactile sensation transmission function, based on teacher data (corresponding to the first control parameter) and implementation data (corresponding to the second control parameter) that are acquired by the parameter acquisition unit 112 described later as an aspect of provision in the learning assistance processing.

The provision in the learning assistance processing means to comparably provide the teacher data that is acquired in the case where the operation of the learning assistance apparatus 1b (and the learning assistance apparatus 1c) is controlled based on the movement of the user Ub corresponding to the expert and the implementation data that is acquired in the case where the operation of the learning assistance apparatus 1a (and the learning assistance apparatus 1c) is controlled based on the movement of the user Ua corresponding to the learner to the user Ua corresponding to the learner as described above with reference to FIG. 1.

The operation control unit 111 corrects the implementation data of the learning assistance apparatus 1a that is operated by the user Ua corresponding to the learner by using the teacher data that is used when the operation of the learning assistance apparatus 1b that is operated by the user Ub corresponding to the expert is controlled, which corresponds to comparable provision as above. That is, the operation control unit 111 transmits the force tactile sensation (that is, the force tactile sensation corresponding to the force that is applied to the actuator 30 of the learning assistance apparatus 1b that is operated by the user Ub corresponding to the expert) to the learning assistance apparatus 1a that is operated by the user Ua by using the force/tactile sensation transmission function.

Consequently, the learner can grasp whether the movement involving the force tactile sensation differs between the learner and the expert and the degree of the difference. Accordingly, the provision from the operation control unit 111 enables the learner to be more efficiently assisted to learn the movement.

The parameter acquisition unit 112 acquires the control parameters (referred to below as the "control parameters related to the force tactile sensation") that are used when the operation of the operation control unit 111 is controlled by using the force/tactile sensation transmission function. The control parameters related to the force tactile sensation may be any control parameters that are used when the operation of the operation control unit 111 is controlled by using the force/tactile sensation transmission function. For example, the control parameters related to the force tactile sensation can be the positions of the actuators in time series as for the "function of sampling movement" described above with reference to FIG. 5(a) or the result of coordinate conversion in the expression (4) in time series as for the "function of sampling movement" described above with reference to FIG. 5(b). In the description below by way of example, it is supposed that the parameter acquisition unit 112 acquires the positions of the actuators in time series as the control parameters related to the force tactile sensation.

In this case, the parameter acquisition unit 112 causes the teacher data storage unit 121 to store, as the teacher data, the control parameters related to the force tactile sensation that is acquired in the case where the user Ub corresponding to the expert operates the learning assistance apparatus 1b as the master apparatus, and the operation of the learning assistance apparatus 1c that operates as the slave apparatus is controlled. The parameter acquisition unit 112 causes the implementation data storage unit 122 to store, as the implementation data, the control parameters related to the force tactile sensation that is acquired in the case where the user Ua corresponding to the learner operates the learning assistance apparatus 1a as the master apparatus, and the operation of the learning assistance apparatus 1c that operates as the slave apparatus is controlled. That is, the teacher data storage unit 121 functions as a storage unit that stores the teacher data. The implementation data storage unit 122 functions as a storage unit that stores the implementation data.

The teacher data and the implementation data are comparably provided to the learner on which the learning assistance processing is performed. According to the present embodiment, it is supposed that the learner is the user Ua. Accordingly, the learning assistance apparatus 1a (and the terminal 2 connected thereto) that is used by the user Ua provides these. For this reason, according to the present embodiment, the parameter acquisition unit 112 of the learning assistance apparatus 1a acquires the teacher data and the implementation data. Specifically, the parameter acquisition unit 112 of the learning assistance apparatus 1a acquires the teacher data from the operation control unit 111 that is included in the learning assistance apparatus 1b. The parameter acquisition unit 112 of the learning assistance apparatus 1a acquires the implementation data from the operation control unit 111 of the apparatus (that is, the learning assistance apparatus 1a). In this case, the parameter acquisition unit 112 of the learning assistance apparatus 1a may acquire the teacher data and the implementation data from the operation control unit 111 that is included in the learning assistance apparatus 1c. In any case, the teacher data and the implementation data may be acquired in real time while the operation of each learning assistance apparatus 1 is controlled, or may be temporarily stored (that is, buffering) while the operation is controlled and may be collectively acquired after controlling the operation ends.

The display control unit 113 makes a screen based on the teacher data and the implementation data as an aspect of the provision in the learning assistance processing. The display control unit 113 also makes a screen for a user interface related to the learning assistance processing. It is supposed that the display control unit 113 causes a display that is included in the terminal 2 to display the screen, but is not limited thereto and may cause a display that is included in another apparatus to display the screen. For example, each learning assistance apparatus 1 may include a display, and the screen may be displayed on the display.

The screen that is made by the display control unit 113, based on the teacher data and the implementation data will be described with reference to FIG. 9, FIG. 10, and FIG. 11.

Figure 9:
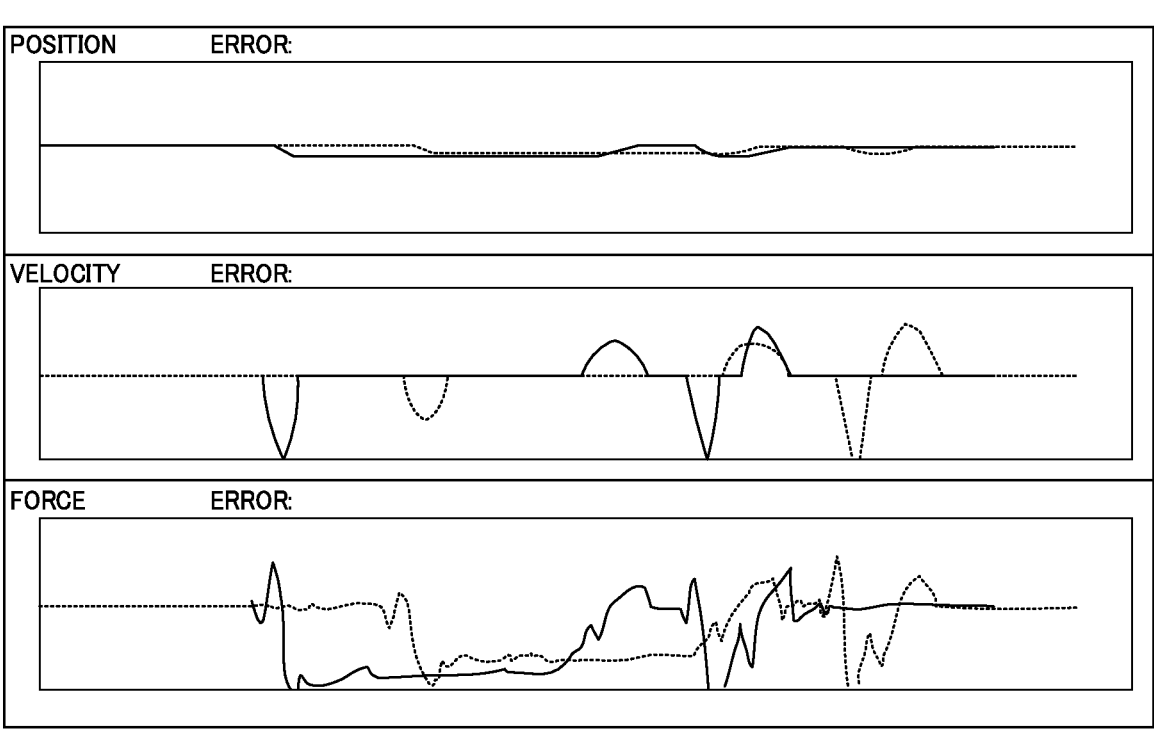
FIG. 9 is a schematic diagram showing an example of the screen that is made by the display control unit 113, based on the teacher data and the implementation data.
Figure 10:
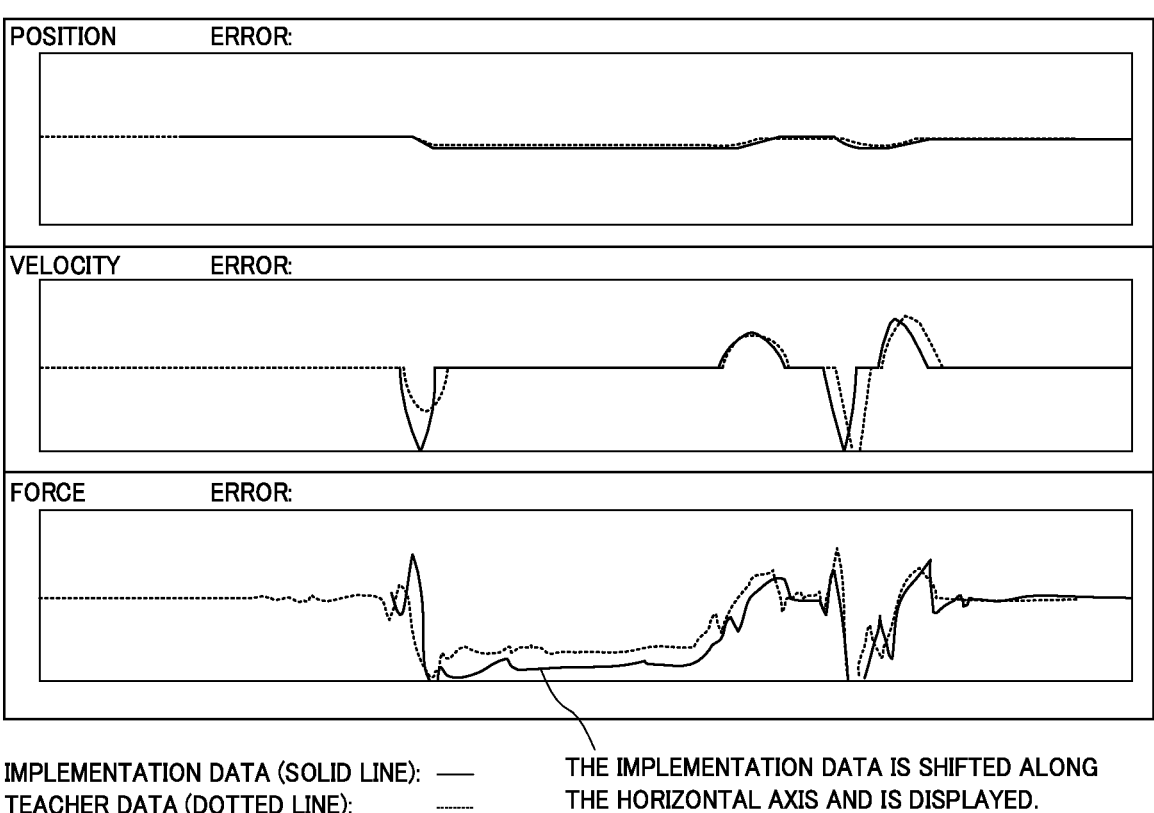
FIG. 10 is a schematic diagram showing another example of the screen that is made by the display control unit 113, based on the teacher data and the implementation data.
Figure 11:
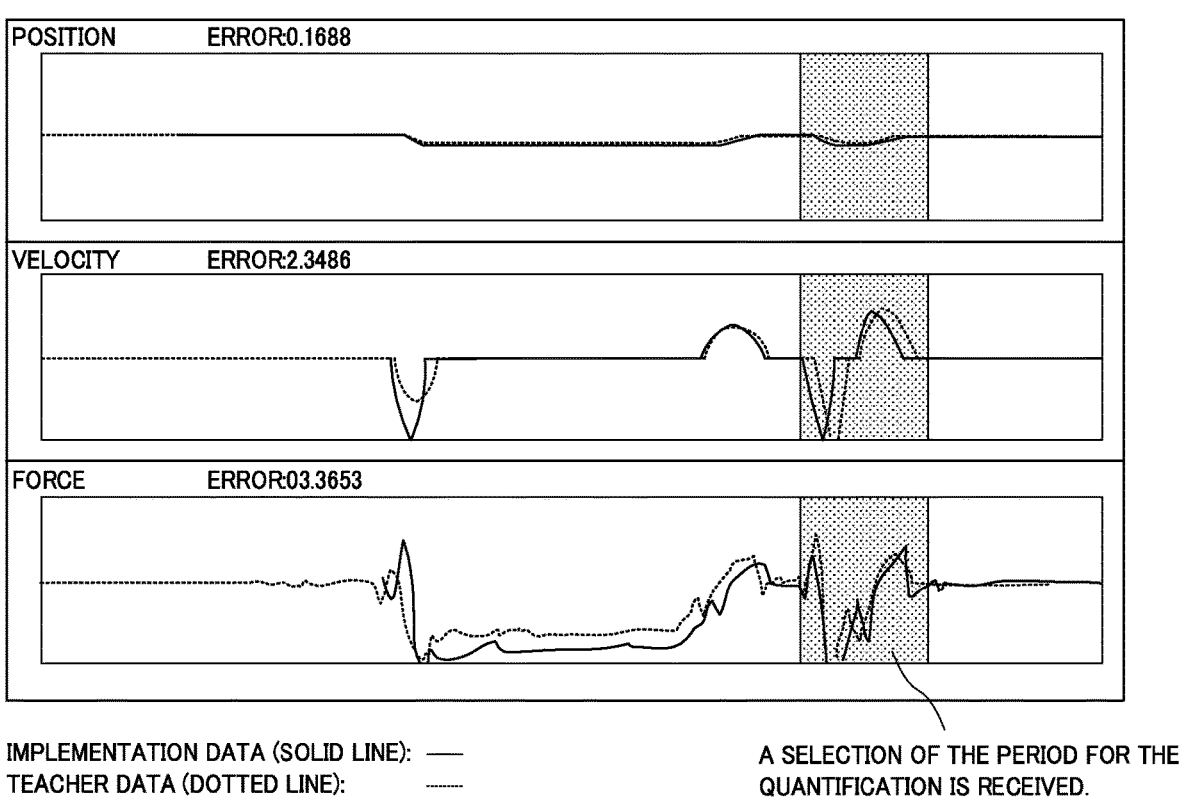
FIG. 11 is a schematic diagram showing another example of the screen that is made by the display control unit 113, based on the teacher data and the implementation data.

FIG. 9, FIG. 10, and FIG. 11 schematically illustrate an example of the screen that is made by the display control unit 113, based on the teacher data and the implementation data.

(Overlapping Display)

For example, as illustrated in FIG. 9, the display control unit 113 makes a screen for information that represents a variation in the teacher data (illustrated by using a dotted line in the figure) in time series and information that represents a variation in the implementation data (illustrated by using a solid line in the figure) in time series such that the information overlaps to achieve a part of the provision. In the figure, the teacher data and the implementation data are illustrated as variations in the position, the velocity, and the force in time series in this order from above. Specifically, the vertical axis represents values that represent the position, the velocity, and the force in this order from above, and the horizontal axis represents a time in graphs. In some actual cases, the graphs illustrate smaller variations than these. In the figure, however, the variations in the graphs are simplified and schematically illustrated.

According to the present embodiment, the position of each actuator 30 in time series is acquired as the teacher data and the implementation data as described above. The velocity of the actuator 30 can be expressed as the integral of the acceleration, and the force of the actuator 30 can be expressed as the product of the mass and the acceleration as described above. Accordingly, the display control unit 113 can make the screen for the variations in the position, the velocity, and the force in time series as illustrated in FIG. 9, based on the teacher data and the implementation data that are acquired by the parameter acquisition unit 112 and the result of calculation such as the integral of these.

The learner who views the display can grasp whether the movement involving the force tactile sensation differs between the learner and the expert and the degree of the difference in time series. For example, it can be grasped that the movement does not differ with a timing, but the movement greatly differs with another timing.

Accordingly, not only the provision from the operation control unit 111 (that is, the transmission of the force tactile sensation) but also the provision from the display control unit 113 (that is, the display in time series) enables the learner to be more efficiently assisted to learn the movement. In the following description, both of the provision from the operation control unit 111 and the provision from the display control unit 113 are supposed. However, this is not a limitation, and the limitation to one of the provisions is acceptable.

(Axis Offset)

As for the overlapping display of the graphs in time series by using the display control unit 113, a process of facilitating the comparison between the teacher data and the implementation data for the learner may also be performed. For example, a difference between the teacher data and the implementation data (that is, an offset) on the vertical axis and the horizontal axis can be adjusted depending on, for example, the operation of the user for the display. For example, as for variations in the values that represent the position, the velocity, and the force (that is, (the vertical axis), there is not much difference between the teacher data and the implementation data. In some cases, however, there is a difference between timings with which these vary (that is, the horizontal axis). In these cases, the difference between the timings with which these vary (that is, the horizontal axis) is adjusted before the comparison. Consequently, differences in the variations in the values that represent the position, the velocity, and the force can be more appropriately compared than the case where the graphs in time series are compared with each other as it is.

For example, in the case of the teacher data and the implementation data as illustrated in FIG. 9, the implementation data or the teacher data is shifted along the horizontal axis and is displayed. For example, the implementation data is shifted along the horizontal axis and is displayed as illustrated in FIG. 10. The display enables the differences in the variations in the values that represent the position, the velocity, and the force to be more appropriately compared. The implementation data or the teacher data can be shifted along the vertical axis and can be displayed or can be shifted along both of the vertical axis and the horizontal axis and can be displayed, based on a similar idea.

(Quantification of Comparison)

As for the overlapping display of the graphs in time series by using the display control unit 113, for example, the degree of non-coincidence or the degree of coincidence between the teacher data and the implementation data with a freely selected timing in a freely selected period may be quantified for comparison display in addition to comparison display on which the graphs overlap. In this case, the timing and the period are freely selected, for example, depending on the operation of the user. For example, as illustrated by using a hatching region in FIG. 11, a selection of the period for the quantification is received. The display control unit 113 calculates the result of comparison of the quantified degree of non-coincidence between the teacher data and the implementation data in the selected period as for the position, the velocity, and the force. The result of comparison is displayed, for example, as illustrated as an "error value" in FIG. 11. Consequently, the learner can compare the result of comparison of the quantified degree of non-coincidence. Examples of a method of quantifying the degree of non-coincidence between the teacher data and the implementation data include a method of acquiring the degree of non-coincidence between the teacher data and the implementation data by using a least square error and a method of acquiring the degree of non-coincidence between the teacher data and the implementation data, based on an indicator such as cosine similarity.

The display control unit 113 may use any of the "overlapping display", the "axis offset", and the "quantification of comparison" described above. For example, these may be combined depending on, for example, the operation of the user Ua corresponding to the learner.

The teacher data process unit 114 acquires the teacher data that is used for the provision from the operation control unit 111 or the provision from the display control unit 113 described above by processing the teacher data that is actually acquired by the parameter acquisition unit 112 before the provision. For example, the teacher data process unit 114 processes the teacher data in the case where it is determined in advance that the teacher data is to be processed or in the case where the user Ua corresponding to the learner, for example, inputs an instruction operation for processing.

Figure 12:
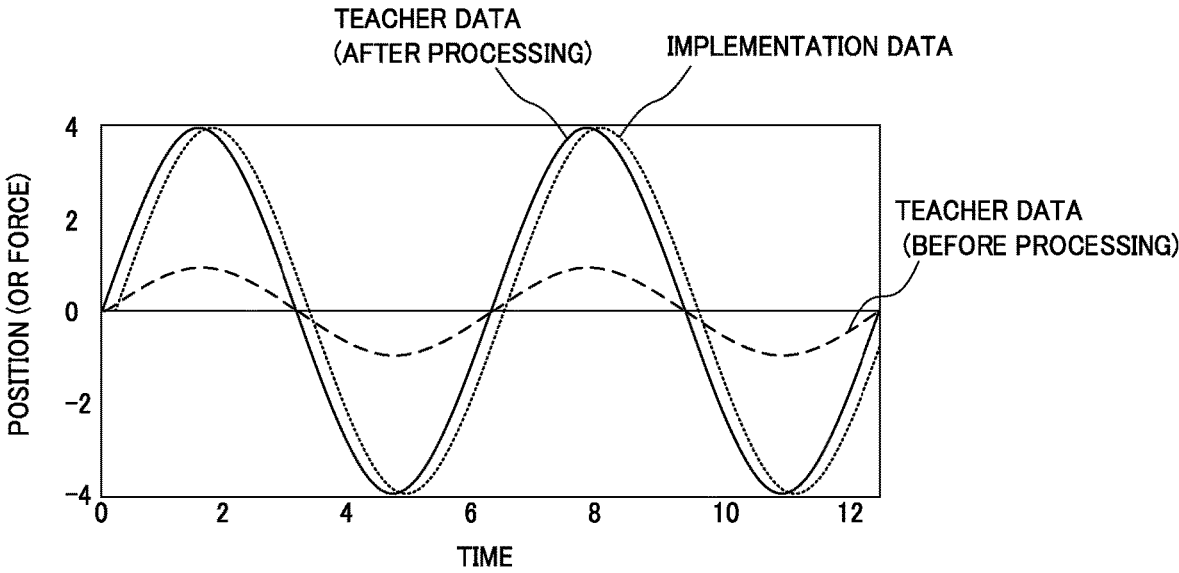
FIG. 12 is a schematic diagram showing an example of processing the teacher data by using the teacher data process unit 114.
Figure 13:
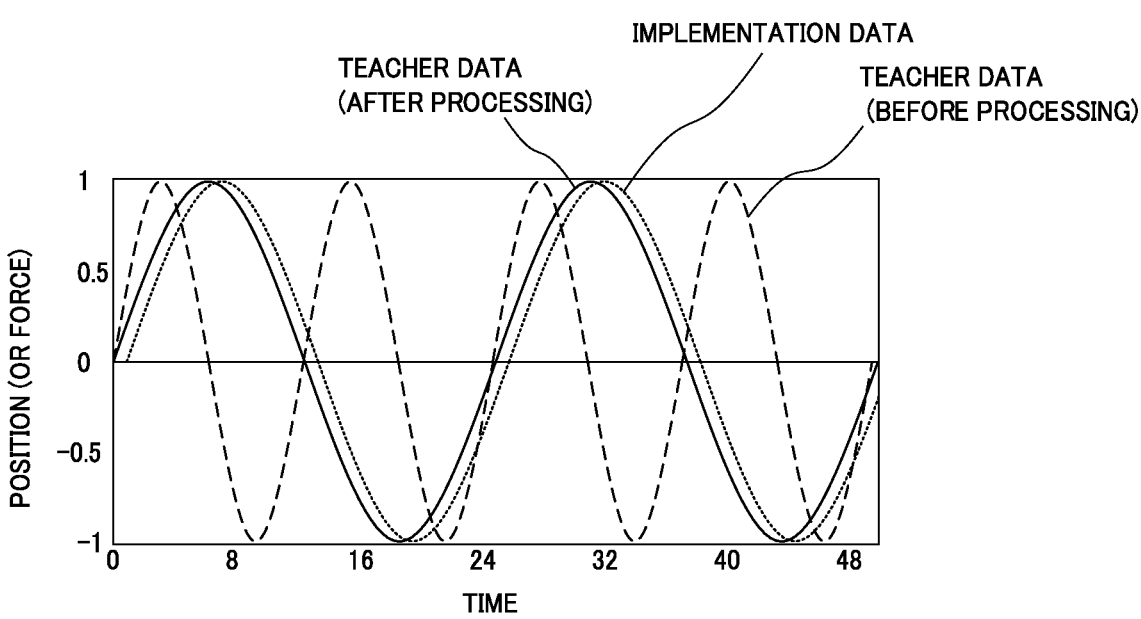
FIG. 13 is a schematic diagram showing another example of processing the teacher data by using the teacher data process unit 114.

Processing the teacher data by using the teacher data process unit 114 will be described with reference to FIG. 12 and FIG. 13. FIG. 12 and FIG. 13 schematically illustrate an example of processing the teacher data by using the teacher data process unit 114.

(Position/Force Scaling)

The teacher data process unit 114 processes the teacher data, for example, such that the value of the position or the force in the teacher data is increased or reduced as scaling.

The scaling can be carried out in a manner in which the teacher data process unit 114 processes the teacher data by using the "force/tactile sensation transmission function involving scaling" described above depending on the operation of, for example, the user Ua corresponding to the learner.

In this case, as illustrated in, for example, FIG. 12, the scaling is carried out such that the value that represents the position or the force in the teacher data is increased. As a result of the scaling thus carried out, movement in accordance with the position or the force in the teacher data is approximate movement rougher than fine movement of the expert. That is, the degree of difficulty to learn the movement is reduced for the learner. The provision from the operation control unit 111 and the display control unit 113 after the teacher data process unit 114 carries out the scaling enables the learner to easily learn the movement. In this way, at the beginning of the learning, the magnification of the value of the position or the force is increased during the scaling to reduce the degree of difficulty of the learning. As the learning of the learner advances, the magnification of the value of the position or the force is adjusted so as to gradually approach that in the teacher data to increase the degree of difficulty of the learning. Consequently, the learner can be more efficiently assisted to learn the movement.

(Time Scaling)

The teacher data process unit 114 processes the teacher data, for example, such that a variation in the value that represents the position or the force in the teacher data lasts for a longer time or a shorter time as the scaling. The scaling can be carried out in a manner in which the teacher data process unit 114 processes the teacher data by using "reproduction of a function with time scaling" described above depending on the operation of, for example, the user Ua corresponding to the learner.

In this case, as illustrated in, for example, FIG. 13, the scaling is carried out such that the variation in the value that represents the position or the force in the teacher data lasts for a longer time. As a result of the scaling thus carried out, movement in accordance with the position or the force in the teacher data is gentle movement slower than quick movement of the expert. That is, the degree of difficulty to learn the movement is reduced for the learner. The provision from the operation control unit 111 and the display control unit 113 after the teacher data process unit 114 carries out the scaling enables the learner to easily learn the movement. In this way, at the beginning of the learning, a degree at which the variation in the value that represents the position or the force lasts for a longer time is increased during the scaling to reduce the degree of difficulty of the learning. As the learning of the learner advances, the degree at which the variation in the value that represents the position or the force lasts for a longer time is adjusted so as to gradually approach that in the teacher data to increase the degree of difficulty of the learning. Consequently, the learner can be more efficiently assisted to learn the movement.

(Edit of Teacher Data)

The teacher data process unit 114 can process the teacher data, for example, such that a characteristic part in the variation in the value that represents the position or the force in the teacher data is sampled, and the sampled part is repeated, or the order of the sampled part is changed for an edit. The edit can be carried out in a manner in which the teacher data process unit 114 edits the teacher data depending on the operation of, for example, the user Ua corresponding to the learner.

In this case, for example, the teacher data is edited such that a variation in the position or the force corresponding to a movement part to be particularly learned or a movement part that is difficult to learn in a series of the movement of the user Ub corresponding to the expert is sampled, and this is repeated. Consequently, the learner can be more efficiently assisted to learn the movement part to be particularly learned or the movement part that is difficult to learn.

The teacher data process unit 114 may use any of the "position/force scaling", the "time scaling", and the "edit of the teacher data" described above. For example, these may be combined depending on, for example, the operation of the user Ua corresponding to the learner.

The force tactile sensation complement unit 115 acquires force tactile sensation complement data that is a control parameter for controlling the learning assistance apparatus 1*a* such that the operation of the user Ua corresponding to the learner is complemented. The force tactile sensation complement unit 115 corrects the implementation data of the learning assistance apparatus 1*a* that is operated by the user Ua corresponding to the learner by using the force tactile sensation complement data. That is, the operation control unit 111 transmits the force tactile sensation (that is, the force tactile sensation for controlling the learning assistance apparatus 1*a* such that the operation of the user Ua corresponding, to the learner is complemented) to the learning assistance apparatus 1*a* that is operated by the user Ua by using the force/tactile sensation transmission function.

Consequently, the movement of the learner can be complemented in a force tactile sensation manner, and the learner can be more efficiently assisted to learn the movement.

For example, in the case where complement in the force tactile sensation manner is determined to be carried out in advance, or in the case where a condition in which the complement in the force tactile sensation manner is to be carried out based on the operation of the learning assistance apparatus 1*a* that operates as the master apparatus in the present processing is satisfied, the force tactile sensation complement unit 115 determines that the complement in the force tactile sensation manner is to be carried out. The force tactile sensation complement data that is acquired by the force tactile sensation complement unit 115 is generated by, for example, a user and is stored in the complement data storage unit 123. That is, the complement data storage unit 123 functions as a storage unit that stores the force tactile sensation complement data. For example, the force tactile sensation complement data is generated based on the teacher data or is acquired from another apparatus through communication in some cases.

The complement that is carried out by the force tactile sensation complement unit 115 by using the force tactile sensation complement data may be given together with the provision from the operation control unit 111 but is not limited thereto and may be given separately from the provision from the operation control unit 111.

(Complement Based on Remote Operation in Real Time)

The force tactile sensation complement unit 115 carries out complement by using the force tactile sensation complement data, for example, such that the complement is carried out based on the remote operation of the user Ub corresponding to the expert in real time.

In this case, the force tactile sensation complement unit 115 causes the learning assistance apparatus 1*b* that is operated by the user Ub corresponding to the expert to function as the master apparatus and the learning assistance apparatus 1*a* to function as the slave apparatus (the master apparatus in relation to the learning assistance apparatus 1*c*) while the user Ua corresponding to the learner operates the learning assistance apparatus 1*a* for the learning.

Consequently, the user Ub corresponding to the expert can remotely operate the learning assistance apparatus 1*a* in real time during the learning. Accordingly, the user Ub corresponding to the expert can transmit the force tactile sensation such as the magnitude of the force and slight movement to the user Ua corresponding to the learner in real time. That is, the complement in the force tactile sensation manner in real time enables learning assistance to be more efficiently carried out.

In this case, the degree of the transmission of the operation of the user Ub corresponding to the expert to the user Ua corresponding to the learner can be adjusted by using the "scaling function" described above. Consequently, the adjustment can be made, for example, such that the degree of the transmission is increased for transmission with certainty at the beginning of the learning, and the degree of the transmission is gradually reduced for slight transmission as the learning advances.

(Complement by Using Suction Force)

The force tactile sensation complement unit 115 carries out the complement by using the force tactile sensation complement data, for example, such that the complement is carried out by using suction force. In the description below about the force tactile sensation complement unit 115, FIG. 1 is appropriately referred. In this case, the force tactile sensation complement unit 115 sets the imaginary target point 5 as illustrated in FIG. 1, produces the suction force near the imaginary target point 5 toward the target point 5 and complements movement to the target point. For example, the imaginary target point 5 is the target point (or a waypoint on the way) of the work such as processing on the workpiece 4 by using the end effector 3 of the learning assistance apparatus 1*c*. The position of the imaginary target point 5 may be set as the force tactile sensation complement data in advance and may be stored in the complement data storage unit 123 or may be generated based on the teacher data. For example, in the case where a positional relationship between the current position of the end effector 3 of the learning assistance apparatus 1*c* that is derived from the implementation data and the position of the imaginary target point 5 is a predetermined relationship (for example, vicinity), the suction force is produced. The suction force can be acquired by correcting the implementation data such that the force tactile sensation for the suction at the position of the imaginary target point 5 is transmitted to the learning assistance apparatus 1*a*.

Consequently, the user Ua corresponding to the learner can be appropriately guided to the target point of the work and is more efficiently assisted with the learning.

(Complement by Using Directional Provision)

The force tactile sensation complement unit 115 carries out the complement by using the force tactile sensation complement data, for example, such that the complement is carried out by using directional provision. In this case, the force tactile sensation complement unit 115 produces a sense of touch as if a ball subtly bounces and provides a direction, for example, such that the direction toward the target point can be recognized. For this reason, the force tactile sensation complement unit 115 sets the imaginary target point 5 as illustrated in FIG. 1 as in the "complement by using suction force" described above. For example, the imaginary target point 5 may be set as a single point associated with the target point of the work such as processing, or multiple imaginary target points may be set so as to be associated with the trajectory of movement to the target point of the work such as processing. For example, in the case where the work such as processing is carried out, the trajectory of movement may be reproduced by continuously setting the multiple imaginary target points 5 so as to be associated with the trajectory of movement along which the end effector 3 is to move. The positions of the multiple imaginary target points 5 to reproduce the trajectory of movement may be set as the force tactile sensation complement data in advance and may be stored in the complement data storage unit 123 or may be generated based on the teacher data. In the case where a positional relationship between the current position of the end effector 3 of the learning assistance apparatus 1c that is derived from the implementation data and the position (for example, the imaginary target point 5 nearest to the current position of the end effector 3 among the multiple imaginary target points 5 that are associated with the trajectory of movement) of the imaginary target point 5 is a predetermined relationship (for example, out of a predetermined range), a bouncing sense of touch is produced. The bouncing sense of touch enables the direction toward the imaginary target point 5 (for example, the direction of the imaginary target point 5 nearest to the current position of the end effector 3) to be provided to the user Ua corresponding to the learner. For example, the bouncing sense of touch is produced in the case where the current position of the end effector 3 of the learning assistance apparatus 1c changes so as to be farther from the imaginary target point 5, and the bouncing sense of touch is not produced in the case where the current position changes so as to approach the imaginary target point 5. The bouncing sense of touch can be produced by correcting the implementation data such that the force tactile sensation corresponding to the bouncing sense of touch is transmitted to the learning assistance apparatus 1a. In this case, as for the bouncing sense of touch, the cycle of bouncing and the intensity of bouncing may be changed stepwise. For example, as the position is farther from the imaginary target point 5, the cycle may be decreased, and the intensity of the bouncing sense of touch may be increased. In contrast, the bouncing sense of touch may be produced in the case where the current position of the end effector 3 changes so as to approach imaginary target point 5, and the bouncing sense of touch may not be produced in the case where the current position changes so as to be farther from the imaginary target point 5.

Consequently, the user Ua corresponding to the learner can be appropriately guided in the direction of the target point of the work or the direction of the trajectory of movement to the target point of the work and can be more efficiently assisted with the learning.

(Complement by Using Force of Repulsion)

The force tactile sensation complement unit 115 carries out the complement by using the force tactile sensation complement data, for example, such that the complement is carried out by using the force of repulsion. In this case, the force tactile sensation complement unit 115 produces the force of repulsion such as one at the time of contact with, for example, a spring or a dumper near the entry prohibition region, and the end effector 3 of the learning assistance apparatus 1c is prevented from entering the entry prohibition region. For this reason, the force tactile sensation complement unit 115 sets the imaginary entry prohibition region 7 as illustrated in FIG. 1. For example, the imaginary entry prohibition region 7 is a region in which the end effector 3 of the learning assistance apparatus 1c is prohibited from carrying out the work such as processing on the workpiece 4 (that is, entry of the end effector 3). The imaginary entry prohibition region 7 may be set as the force tactile sensation complement data in advance and may be stored in the complement data storage unit 123 or may be generated based on the teacher data. For example, when one layer of two layers composed of different materials is cut, the imaginary entry prohibition region 7 is set to a region corresponding to another layer. The force of repulsion is produced, for example, in the case where a positional relationship between the current position of the end effector 3 of the learning assistance apparatus 1c that is derived from the implementation data and a region corresponding to the imaginary entry prohibition region 7 is a predetermined relationship (for example, within a predetermined range). The force of repulsion can be produced by correcting the implementation data such that the force tactile sensation corresponding to elastic force or viscous force is transmitted to the learning assistance apparatus 1a.

Consequently, entry into the entry prohibition region can be prevented during the operation of the user Ua corresponding to the learner, and the user can be more efficiently assisted with the learning.

(Complement by Using Sense of Roughness or so on)

The force tactile sensation complement unit 115 carries out the complement by using the force tactile sensation complement data, for example, such that the complement is carried out by using a sense of touch such as the sense of roughness. In this case, the force tactile sensation complement unit 115 produces the sense of touch such as the sense of roughness near the entry prohibition region and notifies the user Ua corresponding to the learner of the fact that the end effector 3 of the learning assistance apparatus 1c approaches the entry prohibition region. For this reason, the force tactile sensation complement unit 115 sets the imaginary entry prohibition region 7 as illustrated in FIG. 1 as in the "complement by using force of repulsion" described above. The force of repulsion is produced, for example, in the case where a positional relationship between the current position of the end effector 3 of the learning assistance apparatus 1c that is derived from the implementation data and a region corresponding to the imaginary entry prohibition region 7 is a predetermined relationship (for example, within a predetermined range). The sense of roughness can be produced by correcting the implementation data such that the force tactile sensation corresponding to the sense of touch such as the sense of roughness as for the imaginary entry prohibition region 7 is transmitted to the learning assistance apparatus 1a.

Consequently, approach to the entry prohibition region can be reported during the operation of the user Ua corresponding to the learner, and the user can be more efficiently assisted with the learning.

In the case where the "complement by using force of repulsion" described above or the "complement by using Sense of Roughness or so on" is carried out, the region in which the force of repulsion or the sense of roughness is produced may be a region in which the positional relationship of the region corresponding to the entry prohibition region 7 is a predetermined relationship (for example, within a predetermined range) as described above, but this is not a limitation. For example, the force of repulsion or the sense of roughness may be produced in a region such as an imaginary wall that represents a working region (for example, a working region that interferes with another learning assistance apparatus 1 and another user U, not illustrated) to which the end effector 3 of the learning assistance apparatus 1c is not to move during the work such as processing on the workpiece 4 as in the imaginary wall 8 or the imaginary wall 9 illustrated in FIG. 1.

(Complement by Adjusting Position Scaling)

The force tactile sensation complement unit 115 carries out the complement by using the force tactile sensation complement data, for example, such that the complement is carried out by using position scaling. In this case, even when the master apparatus is excessively moved, the force tactile sensation complement unit 115 can prevent the slave apparatus from excessively moving across a predetermined position, for example, in a manner in which the degree of the position scaling is adjusted depending on the current position of the end effector 3 of the learning assistance apparatus 1c.

For this reason, the force tactile sensation complement unit 115 sets the imaginary entry prohibition region 7 (or an imaginary entry prohibition position is also acceptable) as illustrated in FIG. 1 as in, for example, the "complement by using force of repulsion" described above. For example, a region or position at which the work such as processing is prevented from being progressed is set. As for adjustment of the degree of the position scaling, for example, as the current position of the end effector 3 of the learning assistance apparatus 1c that is derived from the implementation data approaches the region corresponding to the imaginary entry prohibition region 7, the degree of the scaling is increased such that even when the position of the master apparatus changes, the position of the slave apparatus does not change. The scaling can be adjusted, for example, in a manner in which the scaling function is fulfilled as in the "force/tactile sensation transmission function involving position restriction by using the scaling" described above, and the slave apparatus is controlled so as not to move across a position of (1/b+a) (that is, a position corresponding to the imaginary entry prohibition region 7, or the imaginary entry prohibition position).

Consequently, the slave apparatus can be prevented from moving across a predetermined position (that is, the position corresponding to the imaginary entry prohibition region 7 or the imaginary entry prohibition position) during the operation of the user Ua corresponding to the learner, and the user can be more efficiently assisted with the learning.

The force tactile sensation complement unit 115 may carry out the "complement based on remote operation in real time", the "complement by using suction force", the "complement by using directional provision", the "complement by using force of repulsion", the "complement by using sense of roughness or so on", or the "complement by adjusting position scaling", but a combination thereof may be carried out, for example, depending on the operation of the user Ua corresponding to the learner. For example, as for the force tactile sensation complement unit 115, a method for the complement in the force tactile sensation manner may be partly replaced. For example, the complement by using the suction force may be carried out to prevent entry into the imaginary entry prohibition region 7, or complement by using, for example, the suction force, the force of repulsion, and the sense of touch such as the sense of roughness may carried out for the directional provision.

The audiovisual complement unit 116 provides complement information for complementing the operation of the user Ua corresponding to the learner to the user Ua corresponding to the learner. Examples of a method for the provision includes a screen on a display that is included in, for example, the terminal 2, the output of a sound (such as a warning sound or a voice) from a speaker that is included in, for example, the terminal 2, and a warning lamp that blinks and that is included in, for example, the terminal 2.

Consequently, the movement of the learner can be audiovisually complemented, and the learner can be more efficiently assisted to learn the movement.

For example, in the case where audiovisual complement is determined to be carried out in advance, or in the case where a condition in which the audiovisual complement is to be carried out based on the operation of the learning assistance apparatus 1a that operates as the master apparatus in the present processing is satisfied, the audiovisual complement unit 116 determines that the audiovisual complement is to be carried out. Audiovisual complement data that is acquired by the audiovisual complement unit 116 is generated by, for example, a user and is stored in the complement data storage unit 123. That is, the complement data storage unit 123 functions as a storage unit that stores not only the force tactile sensation complement data but also the audiovisual complement data. For example, the audiovisual complement data is generated based on the teacher data or is acquired from another apparatus through communication in some cases. The complement may be carried out by the audiovisual complement unit 116 by using the audiovisual complement data together with the provision from the operation control unit 111 but is not limited thereto and may be carried out separately from the provision from the operation control unit 111

Figure 14:
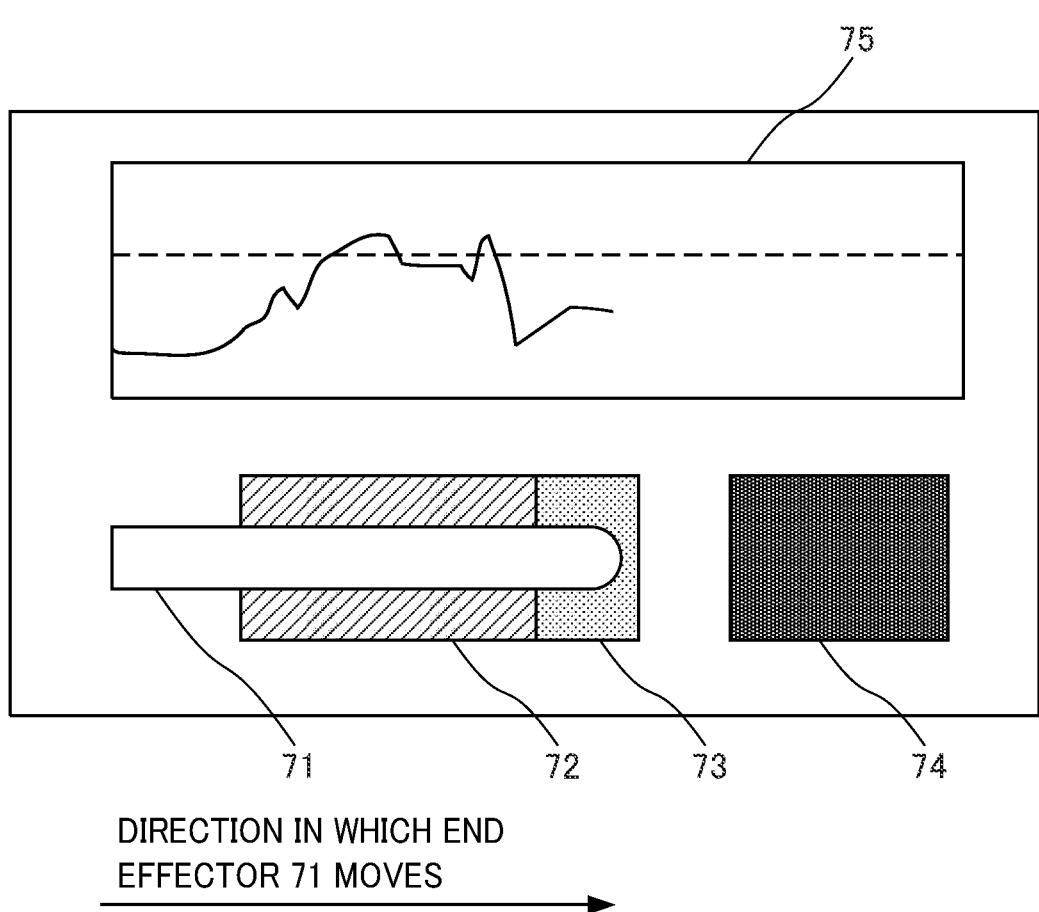
FIG. 14 is a schematic diagram showing an example of the complement display screen by using the audiovisual complement data with the audiovisual complement unit 116.

Specifically, the audiovisual complement unit 116 carries out complement by using the audiovisual complement data, for example, such that the complement is carried out by using a complement display screen. The complement display screen will be described with reference to FIG. 14. FIG. 14 schematically illustrates an example of the complement display screen by using the audiovisual complement data with the audiovisual complement unit 116. On the complement display screen, as illustrated in FIG. 14, an end effector 71 (corresponding to the end effector 3 in FIG. 1), an aerial portion 72 at which no object is present, a portion 73 to be cut (corresponding to a portion to be cut in the workpiece 4 in FIG. 1), a portion 74 prohibited from being cut (corresponding to the imaginary entry prohibition region 7 of the workpiece 4 in FIG. 1), and an implementation data display region 75 are expressed in schematic computer graphics and are displayed.

In the present example, it is supposed that the end effector 71 that is a cutting drill is directly moved from the left-hand to the right-hand in the figure and passes through the aerial portion 72. Subsequently, the portion 73 to be cut is cut, but the portion 74 prohibited from being cut is not cut. These are displayed in a video, based on the variation in the implementation data depending on the movement of the learning assistance apparatus 1c.

The user Ua corresponding to the learner who views a complement screen can visually gasp the distance the end effector 71 is to be moved. The audiovisual complement unit 116 can carry out the complement by providing a sound warning or an alert from, for example, the warning lamp that blinks in addition to the display. For example, in the case where the end effector 71 enters the portion 73 to be cut and subsequently approaches the portion 74 prohibited from being cut, the sound warning or the alert from, for example, the warning lamp that blinks is provided.

The audiovisual complement unit 116 can make a screen for a variation in a value that represents, for example, the force in time series, for example, in the implementation data display region 75 as described above with reference to FIG. 1. In the case where an excessive force that is not suitable for the work such as processing, for example, is applied, the audiovisual complement unit 116 can carry out the complement by providing the sound warning or the alert from, for example, the warning lamp that blinks in addition to the display.

Consequently, the movement of the learner can be audiovisually complemented, and the learner can be more efficiently assisted to learn the movement.

The structure of each learning assistance apparatus 1 is described in detail above. The content of processing that is performed by the learning assistance system S that includes the learning assistance apparatus 1 will now be described in detail.

[Teacher Data Acquiring Processing]

Figure 15:
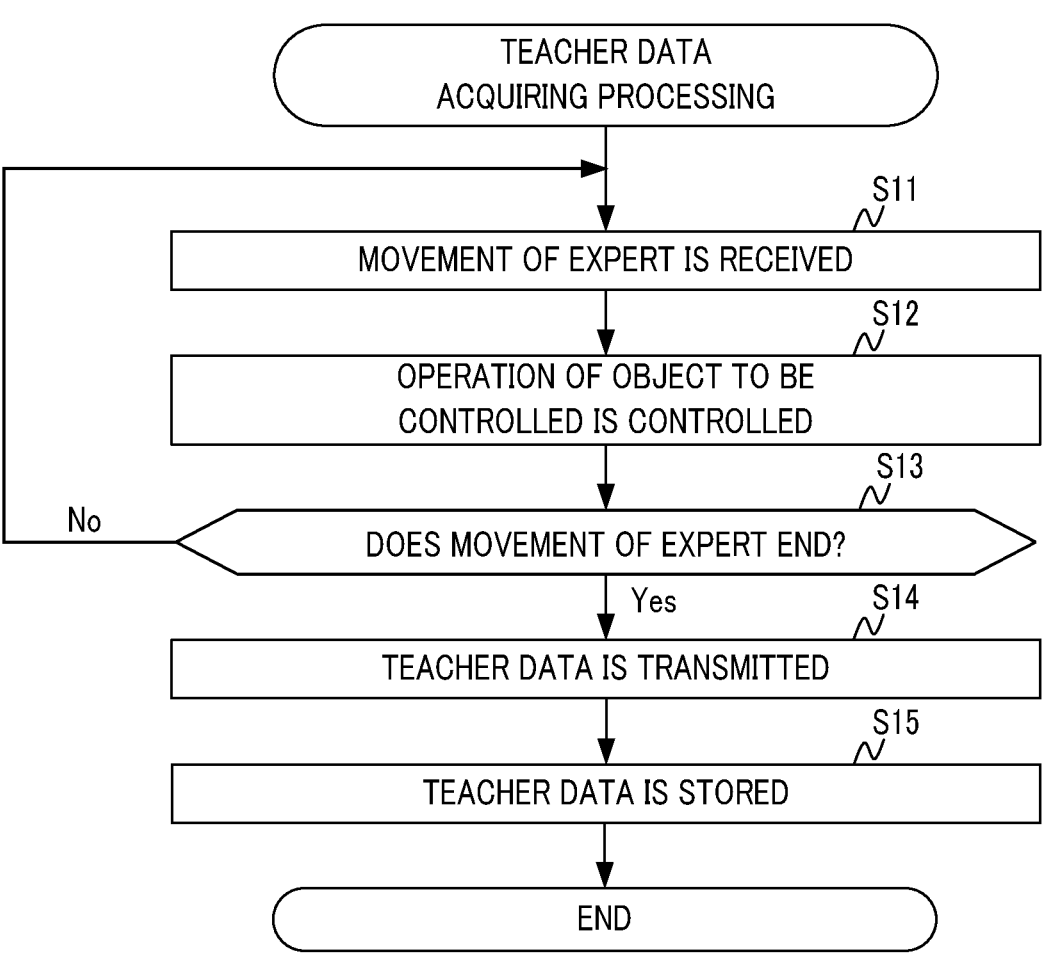
FIG. 15 is a flowchart for describing the flow of the teacher data acquiring processing that is performed by the learning assistance system S.

Referring to FIG. 15, the flow of teacher data acquiring processing that is performed by the learning assistance system S will be described. FIG. 15 is a flowchart for describing the flow of the teacher data acquiring processing that is performed by the learning assistance system S. The teacher data acquiring processing is performed before the learning assistance processing is performed in response to an instruction operation of starting to acquire the teacher data from, for example, the user Ub corresponding to the expert to the learning assistance system S.

At a step S11, the learning assistance apparatus 1b that operates as the master apparatus in the present processing receives the operation of the user Ub corresponding to the expert.

At a step S12, the operation control unit 111 that is included in the learning assistance apparatus 1b that operates as the master apparatus in the present processing and the operation control unit 111 that is included in the learning assistance apparatus 1c that operates as the slave apparatus in the present processing control their own operation, based on the operation of the user Ub corresponding to the expert that is received at the step S11. The operation is controlled by using the force/tactile sensation transmission function described above where the operation of the master apparatus is transmitted to the slave apparatus, and the input of reaction force from an object (for example, the workpiece 4) into the slave apparatus is fed back to the master apparatus.

At a step S13, the operation control unit 111 that is included in the learning assistance apparatus 1b determines whether the operation of the user Ub corresponding to the expert ends. If the operation ends, the determination at the step S13 is Yes, and the processing proceeds to a step S14. If the operation does not end, the determination at the step S13 is No, and the processing is repeated from the step S11.

At the step S14, the parameter acquisition unit 112 that is included in the learning assistance apparatus 1b (or the learning assistance apparatus 1c) acquires the control parameter that is repeatedly used from the step S11 to the step S13 this time and that is stored in a buffer in time series as the teacher data. The parameter acquisition unit 112 that is included in the learning assistance apparatus 1b (or the learning assistance apparatus 1c) transmits the acquired teacher data to the parameter acquisition unit 112 that is included in the learning assistance apparatus 1a.

At a step S15, the operation control unit 111 that is included in the learning assistance apparatus 1a causes the teacher data storage unit 121 that is included in the learning assistance apparatus 1a to store the received teacher data. Consequently, the present processing ends.

[Learning Assistance Processing]

Figure 16:
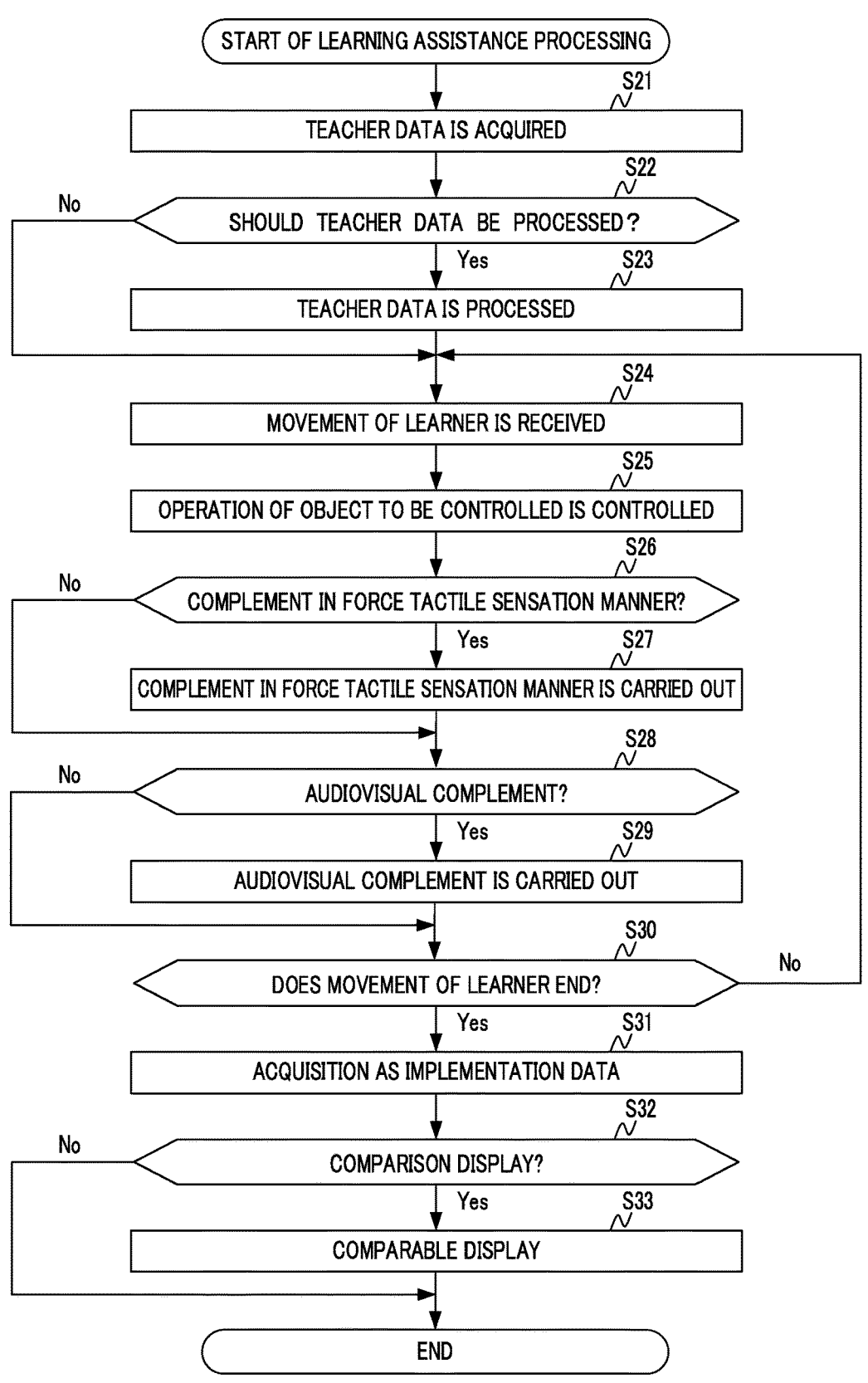
FIG. 16 is a flowchart for describing the flow of the learning assistance processing that is performed by the learning assistance system S.

The flow of the learning assistance processing that is performed by the learning assistance system S will now be described with reference to FIG. 16. FIG. 16 is a flowchart for describing the flow of the learning assistance processing that is performed by the learning assistance system S. The learning assistance processing is performed after the teacher data is stored in the teacher data acquiring processing described above in response to an instruction operation of starting learning assistance from, for example, the user Ua corresponding to the learner to the learning assistance system S.

At a step S21, the display control unit 113 acquires the teacher data to be provided this time from the teacher data storage unit 121.

At a step 322, the teacher data process unit 114 determines whether the teacher data that is acquired at the step S21 is to be processed. For example, in the case where the teacher data is determined to be processed in advance, or in the case where an instruction operation of processing is received from, for example, the user Ua corresponding to the learner, the teacher data process unit 114 determines that the teacher data is to be processed. If the teacher data is to be processed, the determination at the step S22 is Yes, and the processing proceeds to a step S23. If the teacher data is not processed, the determination at the step S22 is No, the processing proceeds to a step S24.

At the step S23, the teacher data process unit 114 processes the teacher data.

At the step S24, the learning assistance apparatus 1a that operates as the master apparatus in the present process receives the operation of the user Ua corresponding to the learner.

At a step S25, the operation control unit 111 that is included in the learning assistance apparatus 1a that operates as the master apparatus in the present process and the operation control unit 111 that is included in the learning assistance apparatus 1c that operates as the slave apparatus in the present process control their own operation, based on the operation of the user Ub corresponding to the expert that is received at the step S24 and the teacher data that is acquired at the step S21. The operation is controlled by using the force/tactile sensation transmission function described above where the control parameter corresponding to the teacher data is used as an aspect of the provision, the operation of the master apparatus is transmitted to the slave apparatus, and the input of reaction force from an object (for example, the workpiece 4) into the slave apparatus is fed back to the master apparatus.

At a step S26, the force tactile sensation complement unit 115 determines whether the complement in the force tactile sensation manner is to be carried out. For example, in the case where the complement in the force tactile sensation manner is determined to be carried out in advance, or in the case where a condition in which the complement in the force tactile sensation manner is to be carried out based on the operation of the learning assistance apparatus 1a that operates as the master apparatus in the present process is satisfied, the force tactile sensation complement unit 115 determines that the complement in the force tactile sensation manner is to be carried out. If the complement in the force tactile sensation manner is to be carried out, the determination at the step S26 is Yes, and the processing proceeds to a step S27. If the complement in the force tactile sensation manner is not carries out, the determination at the step S26 is No, and the processing proceeds to a step S28.

At the step S27, the force tactile sensation complement unit 115 carries out the complement in the force tactile sensation manner.

At the step S28, the audiovisual complement unit 116 determines whether the audiovisual complement is to be carried out. For example, in the case where the audiovisual complement is determined to be carried out in advance, or in the case where a condition in which the audiovisual complement is to be carried out based on the operation of the learning assistance apparatus 1*a* that operates as the master apparatus in the present process, the audiovisual complement unit 116 determines that the audiovisual complement is to be carried out. If the audiovisual complement is to be carried out, the determination at the step S28 is Yes, the processing proceeds to a step S29. If the audiovisual complement is not carries out, the determination at the step S28 is No, the processing proceeds to a step S30.

At the step S29, the audiovisual complement unit 116 carries out the audiovisual complement.

At the step S30, the operation control unit 111 that is Included in the learning assistance apparatus 1*b* determines whether the operation of the user Ua corresponding to the learner ends. If the operation ends, the determination at the step S30 is Yes, the processing proceeds to a step S31. If the operation does not end, the determination at the step S30 is No, the processing is repeated from the step S24.

At the step S31, the parameter acquisition unit 112 that is included in the learning assistance apparatus 1*b* acquires the control parameter that is repeatedly used from the step S11 to the step S13 this time and that is stored in a buffer in time series as the implementation data. The operation control unit 111 that is included in the learning assistance apparatus 1*a* causes the teacher data storage unit 121 that is included in the learning assistance apparatus 1*a* to store the acquired implementation data.

At a step S32, the display control unit 113 determines whether the teacher data that is acquired at the step S21 and the implementation data that is acquired at the step S31 are to be comparably displayed as an aspect of the provision. For example, in the case where the teacher data and the implementation data are determined to be displayed in advance, or in the case where an instruction operation of the display is received from, for example, the user Ua corresponding to the learner, the teacher data process unit 114 determines that the teacher data and the implementation data are to be comparably displayed. If the teacher data and the implementation data are to be comparably displayed, the determination at the step S32 is Yes, the processing proceeds to a step S33. If the teacher data and the implementation data are not comparably displayed, the determination at the step S32 is No, and the present process ends. Even in this case, since the implementation data is stored at the step S31, the display control unit 113 subsequently enables the display with a freely selected timing when the instruction operation of the display is received from, for example, the user Ua.

At the step S33, the display control unit 113 causes the display of, for example, the terminal 2 to comparably display the teacher data that is acquired at the step S21 and the implementation data that is acquired at the step S31 as an aspect of the provision. Consequently, the present process ends.

The learning assistance processing described above enables the teacher data and the implementation data that are the control parameters related to the force tactile sensation to be comparably provided to the user Ua corresponding to the learner by using the operation control unit 111 and the display control unit 113. Consequently, the user Ua corresponding to the learner can grasp whether the movement involving the force tactile sensation differs between the user Ua and the user Ub corresponding to the expert and the degree of the difference. The learning assistance processing enable the learning assistance to be complemented by appropriately using the complement in the force tactile sensation manner or the audiovisual complement.

Accordingly, the learning assistance system S can more efficiently assist the learner to learn the movement.

[Modification]

The embodiment of the present invention is described above. The embodiment, however, is just an example and does not limit the technical scope of the present invention. The present invention can include various embodiments, and various modifications such as omission and replacement can be made without departing from the spirit of the present invention. In this case, the embodiments and the modifications are included in the spirit and scope of the invention described in the present specification and are included in the invention recited in claims and equivalents thereof.

For example, the embodiment of the present invention described above may be modified as follows.

According to the embodiment described above, it is supposed that the functional blocks of the control unit 10 of each learning assistance apparatus 1 are the same as those of the other learning assistance apparatuses 1. This is not a limitation. As for the control units 10 of the learning assistance apparatuses 1 (for example, the learning assistance apparatus 1*b* and the learning assistance apparatus 1*c* according to the embodiment described above) that are not used by the learner, a part of the functional blocks may be omitted. For example, as for the control units 10 of the learning assistance apparatuses 1 that are not used by the learner, the functional blocks other than the operation control unit 111 and the parameter acquisition unit 112 may be omitted.

According to the embodiment described above, it is supposed that the learning assistance for the learner includes all of the provision from the operation control unit 111, the provision from the display control unit 113, the complement in the force tactile sensation manner, and the audiovisual complement. This is not a limitation. Only any one of these may be carried out. In this case, the functional block for the learning assistance that is not carried out may be omitted.

According to the embodiment described above, the control unit 10 of each learning assistance apparatus 1 includes the operation control unit 111, and the operation control unit 111 controls an operation to fulfil, for example, the force/tactile sensation transmission function. This is not a limitation. An apparatus (for example, the terminal 2) for controlling the operation may fulfil the functions of the function-dependent force/velocity distribution conversion block FT, the ideal force origin block FC, the ideal velocity (position) origin block PC, and the reverse conversion block IFT in FIG. 2 and FIG. 3. The apparatus for controlling the operation may receive, for example, the reference value from each learning assistance apparatus 1, and each learning assistance apparatus 1 may fulfil, for example, the force/tactile sensation transmission function, based on control by using the apparatus for controlling the operation.

According to the embodiment described above, it is supposed that the display control unit 113 comparably displays the teacher data and the implementation data after the movement of the learner ends. This is not a limitation. During the movement of the learner, the teacher data and the implementation data at a point may be comparably displayed. Consequently, the learner can grasp whether there is a difference in the movement involving the force tactile sensation and the degree of the difference in real time during the movement of the learner.

According to the embodiment described above, it is supposed that the learning assistance apparatus 1 (for example, the learning assistance apparatus 1c, according to the embodiment described above) that operates as the slave apparatus actually carries out the work such as processing. It is also supposed that the operation of the master apparatus is transmitted to the slave apparatus, and the input of reaction force from an object (for example, the workpiece 4) into the slave apparatus is fed back to the master apparatus. This is not a limitation. An imaginary slave apparatus in a virtual space may carry out work such as processing on an imaginary object. The operation of the master apparatus may be transmitted to the imaginary slave apparatus, and the input of reaction force from the imaginary object into the imaginary slave apparatus may be fed back to the master apparatus.

At this time, the action of the imaginary slave apparatus is contact with the imaginary object, and conversion is carried out for assigning the energy of the force and the position with respect to a variable in the virtual space and a variable in the real space. At this time, the force tactile sensation is transmitted between the master apparatus and the imaginary object, and the force tactile sensation that is received by the imaginary slave apparatus is transmitted.

In this way, for example, the work such as processing is not actually carried out on, for example, the workpiece 4, and the teacher data acquiring processing and the learning assistance processing can be performed. The imaginary object in the virtual space can be imaginarily produced or can be reproduced in the virtual space from an object in the real space, based on, for example, characteristics of a substance in the real space.

The learning assistance system S according to the present embodiment includes the operation control unit 111, the parameter acquisition unit 112, and the display control unit 113 as described above.

The operation control unit 111 controls the apparatus to be controlled, based on the operation of the user and causes the apparatus to be controlled to operate in accordance with the force tactile sensation during the operation of the user.

The parameter acquisition unit 112 acquires the control parameters that are used for the control of the operation control unit 111.

The operation control unit 111 and the display control unit 113 comparably provide, to the second user, the first control parameter that is acquired by the parameter acquisition unit 112 in the case where the operation control unit 111 controls the operation of the apparatus to be controlled, based on the operation of the first user and the second control parameter that is acquired by the parameter acquisition unit 112 in the case where the operation control unit 111 controls the operation of the apparatus to be controlled, based on the operation of the second user.

As for the first user (for example, the expert) and the second user (for example, the learner), the learning assistance system S thus acquires the control parameters that are used to cause the apparatus to be controlled to operate in accordance with the force tactile sensation during the operations of the users and comparably provides the control parameters for the users to the second user. Consequently, the second user can grasp whether the movement involving the force tactile sensation differs between the second user and the first user and the degree of the difference.

Accordingly, the learning assistance system S can more efficiently assist the learner to learn the movement.

The operation control unit 111 includes the position sensor 40, the force/velocity distribution conversion block FT, the ideal force origin block FC, the ideal velocity (position) origin block PC, and the reverse conversion block IFT in order to control the apparatus to be controlled, based on the operation of the user described above.

The position sensor 40 detects positional information involved in the operation of the apparatus to be controlled.

The force/velocity distribution conversion block FT carries out conversion for assigning control energy into the energy of predetermined physical quantity, based on information about the predetermined physical quantity corresponding to the positional information and information on which the control is based.

The ideal force origin block FC and the ideal velocity (position) origin block PC calculate the control amount of the predetermined physical quantity, based on the energy of the predetermined physical quantity that is assigned by the force/velocity distribution conversion block FT.

The reverse conversion block IFT carries out reverse conversion of the control amount to return an output based on the control amount that is calculated by the ideal force origin block FC and the ideal velocity (position) origin block PC to the apparatus to be controlled and determines an input into the apparatus to be controlled.

Consequently, in the case where the users make the movement involving the force tactile sensation, the operation of the apparatus to be controlled can be controlled based on the control parameters related to the force tactile sensation.

The display control unit 113 makes a screen for information that represents a variation in the first control parameter in time series and information that represents a variation in the second control parameter in time series such that the information overlaps to achieve a part of the provision.

Consequently, the second user can easily visually grasp whether the movement involving the force tactile sensation differs between the second user and the first user in time series and the degree of the difference.

The display control unit 113 corrects the second control parameter, based on the first control parameter during the operation of the apparatus to be controlled involved in the movement of the second user to achieve a part of the provision.

Consequently, the second user can easily grasp whether the movement involving the force tactile sensation differs between the second user and the first user in time series by using the force tactile sensation.

The learning assistance system S also includes the teacher data process unit 114.

The teacher data process unit 114 processes the first control parameter.

The operation control unit 111 and the display control unit 113 use the first control parameter that is processed by the teacher data process unit 114 for the provision.

Consequently, the second user can easily grasp whether the movement involving the force tactile sensation differs between the second user and the first user in time series and the degree of the difference by using the force tactile sensation.

There is another apparatus to be controlled that differs from the apparatus to be controlled.

During the operation of the apparatus to be controlled involved in the movement of the second user, the other apparatus to be controlled operates in real time as the master apparatus that is used by another user who differs from the second user, and the apparatus to be controlled operates in real time as the slave apparatus that is used by the second user.

The master apparatus and the slave apparatus are communicationally connected to transmit and receive the control parameters.

Consequently, the other user can carry out the assistance of learning in real time during the movement of the second user.

The learning assistance system S also includes the force tactile sensation complement unit 115.

The force tactile sensation complement unit 115 corrects the second control parameter, based on a third control parameter that is a control parameter for controlling the apparatus to be controlled such that the movement of the second user is complemented.

Consequently, the apparatus to be controlled can be controlled so as to complement the movement of the second user.

The learning assistance system S also includes the audiovisual complement unit 116.

The audiovisual complement unit 116 provides the complement information for complementing the movement of the second user, based on the second control parameter.

Consequently, the complement information for complementing the movement of the second user can be outputted based on the state of the second control parameter.

[Function Fulfilled by Hardware or Software]

The functions for performing the series of processes according to the embodiment described above can be fulfilled by using hardware, can be fulfilled by using software, or can be fulfilled by using a combination thereof. In other words, an aspect to fulfill the functions is not particularly limited provided that the functions for performing the series of processes described above are fulfilled by the learning assistance system S.

For example, in the case where the functions for performing the series of processes described above are fulfilled by a processor that performs an arithmetic operation, examples of the processor that performs the arithmetic operation include processing apparatus such as a single processor, multiple processors, or a multi-core processor, and a combination of the processing apparatus and a processing circuit such as an ASIC (Application Specific Integrated Circuit) or a FPGA (Field-Programmable Gate Array).

For example, in the case where the functions for performing the series of processes described above are fulfilled by using software, a program that is included in the software is install in a computer via a network or a recording medium. In this case, the computer may be a computer into which exclusive hardware is incorporated or may be a general-purpose computer (for example, a typical electronic device such as a general-purpose personal computer) that can perform a predetermined function by installing a program. Steps of a written program may include only processes that are sequentially performed in time series and may include processes that are performed in parallel or processes that are separately performed. The steps of the written program may be performed in a freely selected order without departing from the spirit of the present invention.

The recording medium in which the program is recorded may be provided to a user by being distributed separately from the computer or may be provided to a user with the recording medium incorporated into the computer in advance. In this case, examples of the recording medium that is distributed separately from the computer include a magnetic disk (including a floppy disk), an optical disk, and a magneto-optical disk. Examples of the optical disk include a CD-ROM (Compact Disc-Read Only Memory), a DVD (Digital Versatile Disc), and a Blu-ray (register trademark)

Disc (a Blu-ray Disc). Examples of the magneto-optical disk include a MD (Mini Disc). Examples of the recording medium that is provided to a user with the recording medium incorporated into the computer in advance include the storage unit 12 in FIG. 5 in which the program is recorded.

REFERENCE SIGNS LIST 1a, 1b, 1c learning assistance apparatus, 2 terminal, 3 end effector, 4 workpiece, 5 imaginary target point, 6 imaginary directional sense of touch, 7 imaginary entry prohibition region, 8 imaginary wall, 9 imaginary wall, 10 control unit, 11 processor, 111 operation control unit, 112 parameter acquisition unit, 113 display control unit, 114 teacher data process unit, 115 force tactile sensation complement unit, 116 audiovisual complement unit 116, 12 storage unit, 121 teacher data storage unit, 122 implementation data storage unit, 123 complement data storage unit, 13 ROM, 14 RAM, 15 communication unit, 16 input unit, 17 output unit, 20 driver, 30 actuator, 40 position sensor, CS control object system, FT function-dependent force/velocity distribution conversion block, FC ideal force origin block, PC ideal velocity (position) origin block, IFT reverse conversion block, S learning assistance system, Ua, Ub user

The invention claimed is:

1. A learning assistance system comprising:

a memory; and a hardware processor which executes a program stored in the memory to control the learning assistance system, the hardware processor, under control of the stored program, being configured to perform processes including:

controlling an apparatus to be controlled, based on an operation of a user, such that the apparatus to be controlled operates in accordance with a force tactile sensation during the operation of the user;

acquiring a first control parameter that is used for control of the apparatus to be controlled based on an operation of a first user;

processing the first control parameter by performing a scaling of a value of the first control parameter acquired when the apparatus to be controlled is controlled based on the operation of the first user, the first control parameter corresponding to at least one of a force, a position, or a time, such that the first control parameter after the processing reproduces an operation that is different from an operation that the apparatus to be controlled actually performed using the first control parameter before the processing;

correcting, by using the first control parameter having been processed by performing the scaling, a second control parameter when the apparatus to be controlled is operated according to an operation of a second user;

displaying a first waveform that represents a variation in the first control parameter in time series and a second waveform that represents a variation in the second control parameter in time series such that the first waveform and the second waveform are displayed in an overlapped manner; and displaying, in a relatively shifted state, a time axis of one of the first control parameter and the second control parameter displayed in the overlapped manner.

2. The learning assistance system according to claim 1, wherein the controlling the apparatus to be controlled includes:

detecting positional information involved in the operation of the apparatus to be controlled;

carrying out conversion for assigning control energy into energy of a predetermined physical quantity, based on information about the predetermined physical quantity corresponding to the positional information and based on information on which control is based;

calculating a control amount of the predetermined physical quantity, based on the energy of the assigned predetermined physical quantity; and carrying out reverse conversion of the control amount to return an output based on the calculated control amount to the apparatus to be controlled, and determining an input into the apparatus to be controlled.

3. The learning assistance system according to claim 1, wherein the processes further include:

imagining an imaginary object around the apparatus to be controlled; and correcting the second control parameter when the apparatus to be controlled is operated according to the operation of the second user, thereby transmitting an imaginary reaction force that the apparatus to be controlled receives from the imaginary object to the second user.

4. A learning assistance method comprising:

controlling an apparatus to be controlled, based on an operation of a user, such that the apparatus to be controlled operates in accordance with a force tactile sensation during the operation of the user;

acquiring a first control parameter that is used for control of the apparatus to be controlled based on an operation of a first user;

processing the first control parameter by performing a scaling of a value of the first control parameter acquired when the apparatus to be controlled is controlled based on the operation of the first user, the first control parameter corresponding to at least one of a force, a position, or a time, such that the first control parameter after the processing reproduces an operation that is different from an operation that the apparatus to be controlled actually performed using the first control parameter before the processing;

correcting, by using the first control parameter having been processed by performing the scaling, a second control parameter when the apparatus to be controlled is operated according to an operation of a second user;

displaying a first waveform that represents a variation in the first control parameter in time series and a second waveform that represents a variation in the second control parameter in time series such that the first waveform and the second waveform are displayed in an overlapped manner; and displaying, in a relatively shifted state, a time axis of one of the first control parameter and the second control parameter displayed in the overlapped manner.

5. A learning assistance system comprising:

a memory; and a hardware processor which executes a program stored in the memory to control the learning assistance system, the hardware processor, under control of the stored program, being configured to perform processes including:

controlling an apparatus to be controlled, based on an operation of a user, such that the apparatus to be controlled operates in accordance with a force tactile sensation during the operation of the user;

acquiring a first control parameter that is used for control of the apparatus to be controlled based on an operation of a first user;

processing the first control parameter by performing a scaling of a value of the first control parameter acquired when the apparatus to be controlled is controlled based on the operation of the first user, the first control parameter corresponding to at least one of a force, a position, or a time, such that the first control parameter after the processing reproduces an operation that is different from an operation that the apparatus to be controlled actually performed using the first control parameter before the processing;

correcting, by using the first control parameter having been processed by performing the scaling, a second control parameter when the apparatus to be controlled is operated according to an operation of a second user;

displaying a first waveform that represents a variation in the first control parameter in time series and a second waveform that represents a variation in the second control parameter in time series such that the first waveform and the second waveform are displayed in an overlapped manner; and further displaying a quantified degree of non-coincidence between the first control parameter and the second control parameter displayed in the overlapped manner.

* * * * *